US012362626B2

(12) United States Patent
Nomiyama et al.

(10) Patent No.: US 12,362,626 B2
(45) Date of Patent: Jul. 15, 2025

(54) ROTARY ELECTRICAL MACHINE

(71) Applicant: MITSUBISHI HEAVY INDUSTRIES ENGINE & TURBOCHARGER, LTD., Sagamihara (JP)

(72) Inventors: Takuma Nomiyama, Tokyo (JP); Yuki Ito, Tokyo (JP); Kenji Oura, Tokyo (JP); Yuki Yasuoka, Tokyo (JP); Takaaki Yoshizawa, Kanagawa (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 207 days.

(21) Appl. No.: 18/018,758

(22) PCT Filed: Sep. 14, 2021

(86) PCT No.: PCT/JP2021/033801
§ 371 (c)(1),
(2) Date: Jan. 30, 2023

(87) PCT Pub. No.: WO2022/065140
PCT Pub. Date: Mar. 31, 2022

(65) Prior Publication Data
US 2023/0307981 A1   Sep. 28, 2023

(30) Foreign Application Priority Data
Sep. 25, 2020   (JP) .................. 2020-160840

(51) Int. Cl.
*H02K 9/19* (2006.01)
*H02K 5/20* (2006.01)

(52) U.S. Cl.
CPC .............. *H02K 5/203* (2021.01); *H02K 5/20* (2013.01); *H02K 9/19* (2013.01)

(58) Field of Classification Search
CPC .......... H02K 9/19; H02K 9/193; H02K 9/197; H02K 9/20; H02K 9/00; H02K 9/02;
(Continued)

(56) References Cited

U.S. PATENT DOCUMENTS

| 5,923,108 A | 7/1999 | Matake et al. |
| 2011/0169352 A1 * | 7/2011 | Nagao ................... H02K 11/33 310/59 |

(Continued)

FOREIGN PATENT DOCUMENTS

| DE | 102007035271 A1 * | 1/2009 | .............. H02K 5/20 |
| JP | 9-46972 A | 2/1997 | |

(Continued)

OTHER PUBLICATIONS

Bucher et al, Electric Motor, Jan. 29, 2009, DE 102007035271 (English Machine Translation) (Year: 2009).*

(Continued)

*Primary Examiner* — Alexander A Singh
(74) *Attorney, Agent, or Firm* — Birch, Stewart, Kolasch & Birch, LLP

(57) ABSTRACT

Provided is a technology that can sufficiently suppress the temperature rise of a rotary electrical machine. A rotary electrical machine includes a main body part 10 including a rotator and a stator, and a casing part 20 that houses the main body part 10. The casing part 20 includes a first housing part 5 that surrounds the main body part 10 from a peripheral direction, and a second housing part 6 that houses a bearing for rotatably supporting a rotating shaft 2. The casing part 20 is formed with a cooling passage R extending from an inlet Rs for cooling medium to an outlet Re for cooling medium and not branching off in the middle. The cooling passage R includes a first cooling passage portion R1 that passes through the inside of the first housing part 5 and a second (Continued)

cooling passage portion R2 that passes through the inside of the second housing part 6.

6 Claims, 23 Drawing Sheets

(58) Field of Classification Search
CPC .. H02K 9/04; H02K 9/06; H02K 9/08; H02K 9/10; H02K 9/12; H02K 9/14; H02K 9/16; H02K 9/18; H02K 1/20; H02K 5/20; H02K 5/203; Y02E 60/50
USPC ..... 310/52, 53, 54, 55, 57, 58, 59, 60 R, 61, 310/62, 63, 60 A, 64
See application file for complete search history.

(56) References Cited

U.S. PATENT DOCUMENTS

| | | |
|---|---|---|
| 2019/0297751 A1 | 9/2019 | Okuhata |
| 2020/0028385 A1 | 1/2020 | Hashimoto |
| 2023/0089893 A1* | 3/2023 | Shibata ................. H02K 5/203 310/51 |

FOREIGN PATENT DOCUMENTS

| | | | |
|---|---|---|---|
| JP | 9-51657 A | | 2/1997 |
| JP | 10-52002 A | | 2/1998 |
| JP | 2000083351 A | * | 3/2000 |
| JP | 2015-204653 A | | 11/2015 |
| JP | 2018-207673 A | | 12/2018 |
| JP | 2019-170068 A | | 10/2019 |
| JP | 2020-14355 A | | 1/2020 |
| WO | WO2009/015946 A1 | | 2/2009 |

OTHER PUBLICATIONS

Yokoyama et al, Alternator and Cooler for Vehicle, Mar. 21, 2000, JP 2000083351 (English Machine Translation) (Year: 2000).*
International Search Report and Written Opinion of the International Searching Authority for International Application No. PCT/JP2021/033801, dated Dec. 7, 2021, with an English translation.

* cited by examiner

LOW PRESSURE SIDE ⟷ HIGH PRESSURE SIDE

LOW PRESSURE SIDE ⟷ HIGH PRESSURE SIDE

LOW PRESSURE SIDE ⟵⟶ HIGH PRESSURE SIDE

LOW PRESSURE SIDE ⟵⟶ HIGH PRESSURE SIDE

ROTARY ELECTRICAL MACHINE

FIELD

The present invention relates to a rotary electrical machine.

BACKGROUND

Machines such as motors and generators that perform mutual conversion between mechanical energy and electrical energy and that include a rotating part are collectively referred to as rotary electrical machines and the like, and are mounted on various devices.

A rotary electrical machine includes a rotor (rotor) and a stator (stator). For example, the rotor is rotated by supplying electric power to a coil wound around a stator core.

In general, the rotary electrical machine is provided with a cooling structure that releases the heat generated by power supply to the outside. For example, in Patent Literature 1, in an inner-rotor type rotary electrical machine in which a rotor is disposed inside a stator, a cooling structure is developed to dissipate heat from the outer peripheral side of the stator, by arranging a water-cooling jacket on the outer periphery of a motor frame provided so as to surround the stator and by making water flow through the water-cooling jacket. Moreover, for example, in Patent Literature 2, a cooling structure is developed to dissipate heat not only from the outer peripheral side of the stator but also from the side of a bearing provided to the rotating shaft, by splitting a part of cooling medium that flows through a cooling water passage formed on a motor frame and by making the cooling medium to flow inside a bracket in which the bearing is housed.

CITATION LIST

Patent Literature

Patent Literature 1: Japanese Patent Application Laid-open No. H10-52002
Patent Literature 2: Japanese Patent Application Laid-open No. 2018-207673

SUMMARY

Technical Problem

In recent years, fuel cell vehicles (FCVs) are reduced in size, and there is a demand for a small fuel cell stack to be mounted on an FCV. To obtain large power from a small fuel cell stack, it is effective to supply high-pressure air to the fuel cell stack by using a compressor. However, to do so, a small compressor capable of implementing a high compression ratio is necessary.

What is called a multistage compressor is considered to be the most promising compressor to meet such a demand. FIG. 23 schematically illustrates a configuration example of a multistage compressor. In the multistage compressor illustrated in this example, a first rotary blade (low-pressure side rotary blade) 91 is provided on one end side of a rotating shaft 81 that protrudes from a casing 80 of a rotary electrical machine 8, and a second rotary blade (high-pressure side rotary blade) 92 is provided on the other end side. Moreover, a housing part 90 that houses each of the rotary blades 91 and 92 is disposed on each of side surfaces 801 and 802 on the shaft end side of the casing 80 of the rotary electrical machine 8. When each housing part 90 is fixed to each of the side surfaces 801 and 802 of the casing 80 in an airtight manner, space (housing space) 90a for housing the rotary blades 91 and 92, and space (flow passage space) 90b formed in a substantially ring shape that surrounds the housing space 90a, and that distributes the air compressed by the rotation of the rotary blades 91 and 92 housed in the housing space 90a are formed, between each housing part 90 and each of the side surfaces 801 and 802.

In such a configuration, when the rotating shaft 81 is driven to rotate, the air sucked in from around the center of the low-pressure side rotary blade 91 is compressed to the first pressure by the rotation of the low-pressure side rotary blade 91. The air G1 compressed by the rotation of the low-pressure side rotary blade 91 flows through the flow passage space 90b into the piping (not illustrated) provided in communication with the flow passage space 90b, passes through the piping, and is sent around the center of the high-pressure side rotary blade 92. Then, the air G1 is further compressed to the second pressure by the rotation of the high-pressure side rotary blade 92. The air G2 compressed by the rotation of the high-pressure side rotary blade 92 flows through the flow passage space 90b, and is blown out from the piping (not illustrated) provided in communication with the flow passage space 90b. In this manner, by compressing the air in two stages by the two rotary blades 91 and 92, it is possible to implement a high compression ratio by a small compressor.

In such a compressor, the air G1 and G2 compressed by the rotation of the rotary blades 91 and 92 become considerably hot (in general, even the air G1 on the low pressure side often becomes hot). Thus, while the rotary electrical machine 8 is driven, the rotary electrical machine 8 receives the heat from the hot air G1 and G2 as described above, and is continuously heated. Consequently, the temperature of the rotary electrical machine 8 will be increased. In particular, a bearing provided to a shaft part 81 is disposed at a position close to the air G1 and G2 serving as heat sources. Hence, the temperature of the bearing will be increased significantly.

Moreover, when the low-pressure side and the high-pressure side are compared, the air G2 on the high pressure side is naturally hotter than the air G1 on the low pressure side. Therefore, in particular, the high pressure side of the rotary electrical machine 8 will be strongly heated.

Furthermore, as the configuration illustrated in FIG. 23, when the housing space 90a that houses each of the rotary blades 91 and 92, and the flow passage space 90b through which the compressed air G1 and G2 flow are closed by the side surfaces 801 and 802 of the casing 80 of the rotary electrical machine 8, the side surfaces 801 and 802 are directly exposed to the hot air G1 and G2. Hence the thermal influence on the rotary electrical machine 8 becomes particularly large.

In this manner, the temperature of a rotary electrical machine is increased not only by the internal factors (heat generated by the stator, rotor, bearing, and the like), but also by being heated by the heat source (for example, the compressed hot air G1 and G2) provided outside the rotary electrical machine. The conventional technologies are not capable of sufficiently suppressing the temperature rise of the rotary electrical machine caused by the various factors, and new technologies are in demand.

The present invention has been made to solve the problems described above, and an object of the present invention is to provide a technology capable of sufficiently suppressing the temperature rise of the rotary electrical machine.

Solution to Problem

To achieve the object described above, the present invention has taken the following measures.

A rotary electrical machine according to the present invention includes: a main body part that includes a rotor and a stator; and a casing part that houses the main body part. The casing part includes a first housing part that surrounds the main body part from a peripheral direction, and a second housing part that houses a bearing for rotatably supporting a rotating shaft. The casing part is formed with a cooling passage extending from an inlet for cooling medium to an outlet for cooling medium and not branching off in a middle. The cooling passage includes a first cooling passage portion that passes through inside of the first housing part and a second cooling passage portion that passes through inside of the second housing part.

With this configuration, not only the first cooling passage portion is provided inside the first housing part, but also the second cooling passage portion is provided inside the second housing part. Thus, for example, when a heat source (for example, hot air) is present outside the casing part on the shaft end side of the rotating shaft, the second housing part can block at least a part of the heat transferred from the heat source. That is, the second housing part can function as a thermal insulation member. Moreover, when the cooling medium is distributed through the first and second cooling passage portions provided inside each of the first and second housing parts, the heat is dissipated both from the outer peripheral side of the main body part and the side of the bearing. Thus, it is also possible to suppress the temperature rise of the rotor, stator, and the bearing. Furthermore, in this example, the cooling passage is a single passage extending from the inlet to the outlet and not branching off in the middle. Hence, it is possible to allow the cooling medium to flow throughout the cooling passage at a constant flow rate, and maintain stable thermal insulation properties. Therefore, it is possible to sufficiently suppress the temperature rise of the rotary electrical machine.

Preferably, in the rotary electrical machine, the first housing part has a hollow space surrounding the main body part from a peripheral direction and having an opened end portion in an axial direction, the opened end portion in the hollow space is closed by the second housing part, and at least a part of the hollow space forms the first cooling passage portion.

With this configuration, a part of the cooling medium that passes through the first cooling passage portion can be brought into contact with the second housing part. That is, the cooling medium that passes through the first cooling passage portion can remove heat from the second housing part. Consequently, it is possible to enhance the thermal insulation properties of the second housing part in particular, and promote heat dissipation from the side of the bearing.

Preferably, in the rotary electrical machine, the second housing part is provided on one side and another side in an axial direction of the first housing part, and the second cooling passage portion is provided to only one of the two second housing parts.

With this configuration, for example, when a heat source of relatively high temperature is present outside the casing part on one shaft end side of the rotating shaft, by providing the second cooling passage portion in the second housing part disposed on the side, the second housing part can block at least a part of the heat transferred from the heat source. Moreover, the size of the second housing part on the side where the second cooling passage portion is not provided may be made smaller than that of the other second housing part. In this way, it is possible to reduce the overall size of the rotary electrical machine.

Preferably, in the rotary electrical machine, the second housing part is provided on one side and another side in an axial direction of the first housing part, and the second cooling passage portion is provided to the two second housing parts.

With this configuration, for example, when a heat source is present outside the casing part on both shaft end sides of the rotating shaft, by providing the second cooling passage portion on both of the two second housing parts, each second housing part can block at least a part of the heat transferred from each heat source. Moreover, with this configuration, the heat can be dissipated from both of the two bearings on both sides of the rotating shaft. Hence, it is possible to achieve a particularly high heat dissipation performance.

Advantageous Effects of Invention

According to the present invention, it is possible to sufficiently suppress the temperature rise of a rotary electrical machine.

DESCRIPTION OF EMBODIMENTS

Hereinafter, embodiments of the present invention will be described with reference to the drawings.

1. First Embodiment

<1-1. Basic Configuration of Rotary Electrical Machine>

Figure 1:
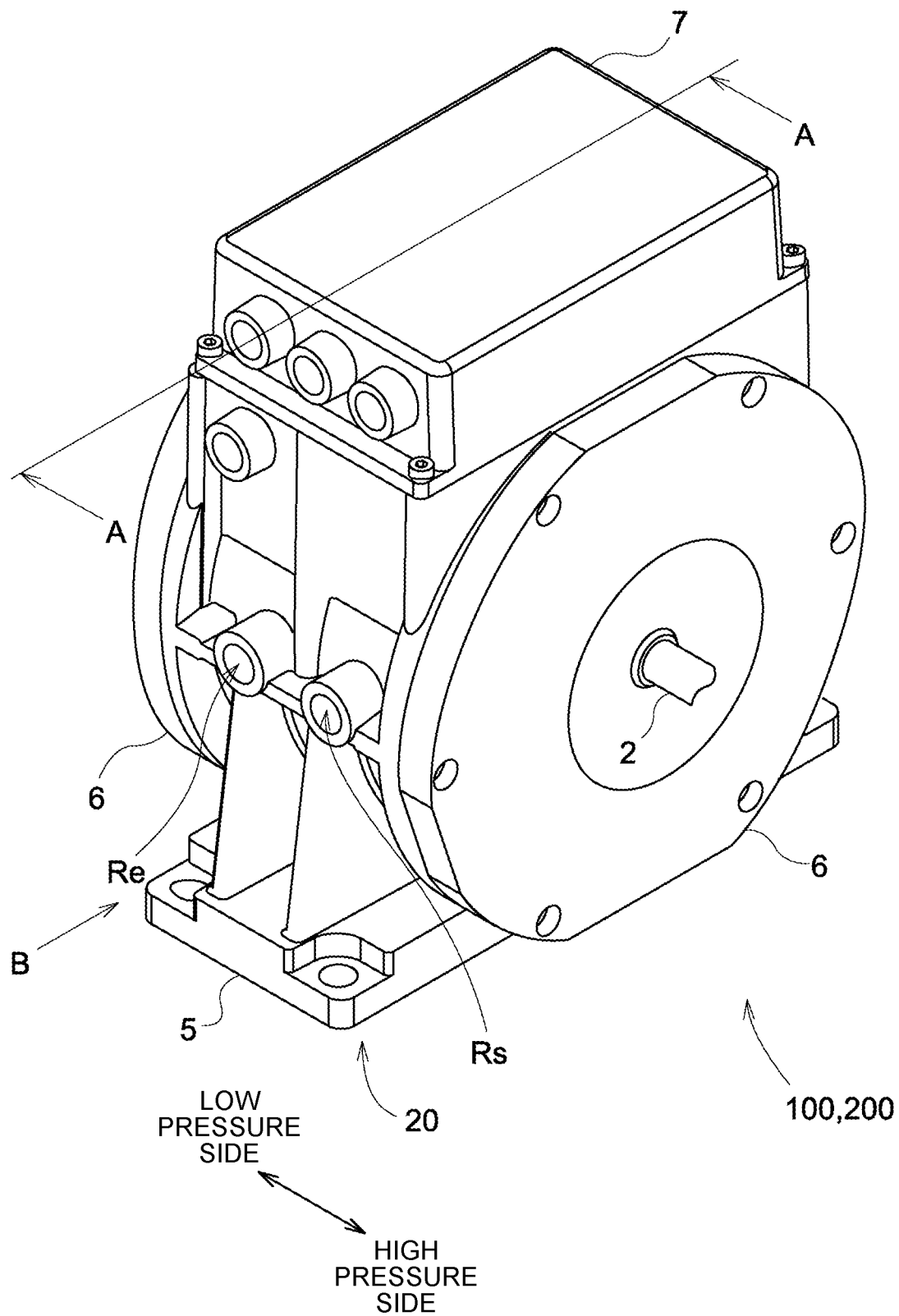
FIG. 1 is an external view of a rotary electrical machine according to a first embodiment.
Figure 2:
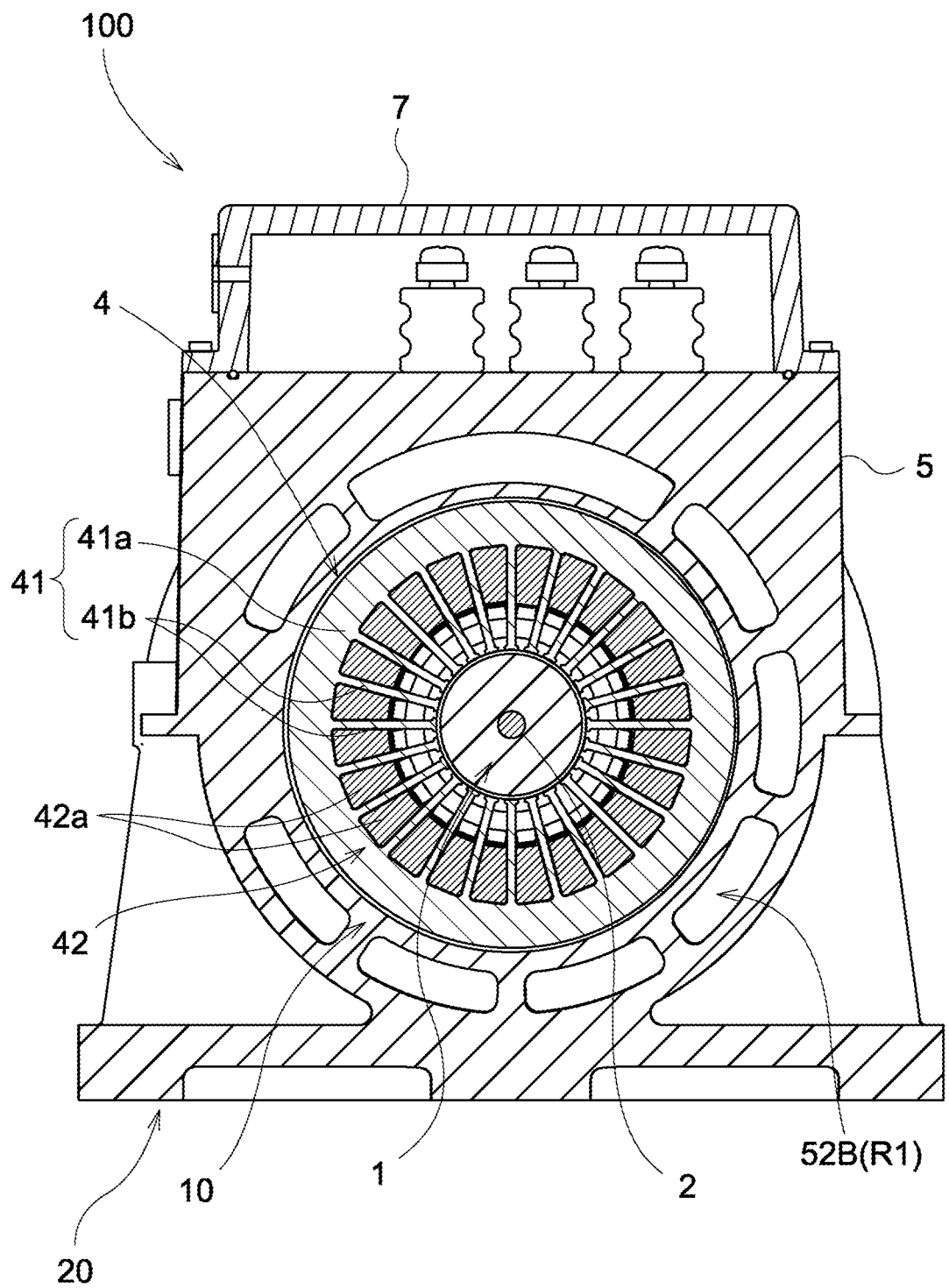
FIG. 2 is a sectional view of the rotary electrical machine viewed from a direction of an arrow A in FIG. 1.
Figure 3:
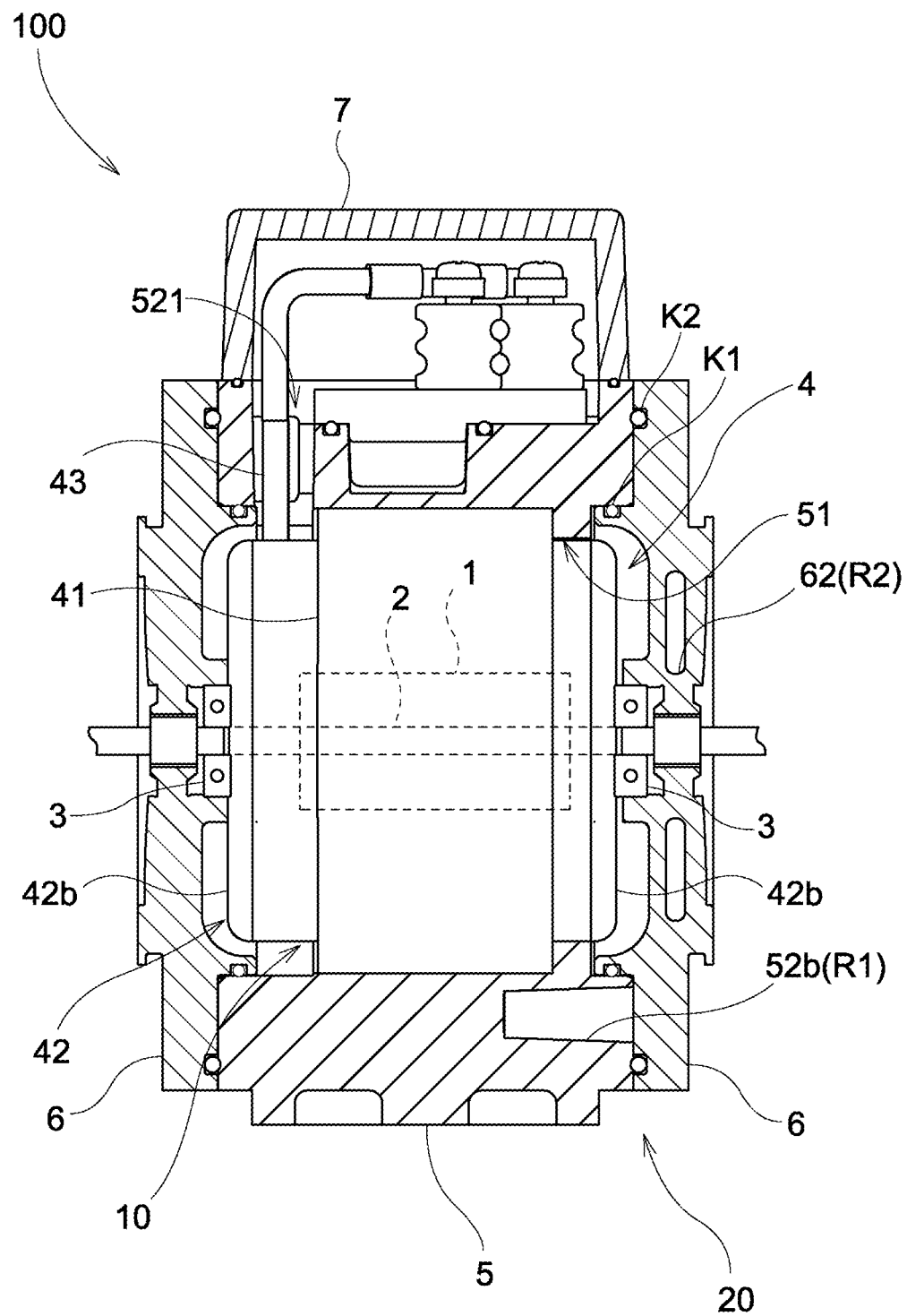
FIG. 3 is a diagram of the rotary electrical machine viewed from a direction of an arrow B in FIG. 1.

The basic configuration of a rotary electrical machine according to a first embodiment will be described with reference to FIG. 1 to FIG. 3. FIG. 1 is an external view of a rotary electrical machine 100 according to the first embodiment. FIG. 2 is a sectional view of the rotary electrical machine 100 viewed from a direction of an arrow A in FIG. 1. FIG. 3 is a diagram of the rotary electrical machine 100 viewed from a direction of an arrow B in FIG. 1. However, for the sake of convenience, FIG. 3 illustrates a cross-section of a casing part 20.

The rotary electrical machine 100 includes a main body part 10 that includes a rotor (rotor) 1, a rotating shaft 2, a bearing 3, a stator (stator) 4, and the like.

The rotor 1 is a cylindrical member, and at the center in the axial direction, a permanent magnet (not illustrated) divided into a cylindrical shape or an arch shape is attached by adhesive or the like. At the center in the radial direction of the rotor 1, a column-shaped penetrating portion that penetrates in the axial direction is provided, and through which the rotating shaft 2 is inserted. The length of the rotating shaft 2 in the axial direction is longer than the rotor 1, and the vicinity of both ends of the rotating shaft 2 protrudes from both end portions of the rotor 1.

The stator 4 is a substantially cylindrical member formed by laminating a plurality of electromagnetic steel sheets in the axial direction. The stator 4 is disposed so as to surround the outer peripheral surface of the rotor 1. The stator 4 has a stator core 41 integrally formed and including a cylindrical yoke 41a and a plurality of teeth 41b that extend from the inner peripheral surface of the yoke 41a toward the radially inner side. The teeth 41b are arranged at intervals along the peripheral direction, and a conductor (coil conductor) 42a of a coil 42 is wound around each of the teeth 41b. Consequently, the coil conductor 42a is disposed in a gap (slot) between the adjacent teeth 41b. Moreover, a portion of the coil conductor 42a that protrudes to the end surface side in the axial direction of the stator core 41 is press-molded and then resin-sealed to configure a ring-shaped coil end part 42b. In the slot, the vicinity of the coil conductor 42a may be covered with insulating paper. Moreover, a wedge or the like may be disposed in the inner end portion of the slot.

The coil 42 is a three-phase coil including a U-phase coil, a V-phase coil, and a W-phase coil. Each end portion of the U-phase coil, the V-phase coil, and the W-phase coil is drawn out from one coil end part 42b toward the radially outer side, and is connected to one end portion of a power line 43 of each phase. The other end side of the power line 43 of each phase is connected to a driving device. When a three-phase AC voltage is applied to the coil 42 from the driving device, the rotor 1 is rotated, and a rotational driving force is output from the rotating shaft 2.

The rotary electrical machine 100 further includes the casing part 20 that houses the main body part 10. The casing part 20 includes a first housing part (motor case) 5, two second housing parts (bearing brackets) 6, a lid part 7, and the like.

The first housing part 5 is a member that surrounds and houses the main body part 10 from the peripheral direction, and for example, is molded by aluminum die-casting. The first housing part 5 has a column-shaped housing space 51 having both opened end portions in the axial direction. The inner diameter of the housing space 51 is substantially the same as the outer diameter of the stator 4, and the size of the housing space 51 in the axial direction is substantially the same as that of the stator 4. The stator 4 is fixed to the first housing part 5 while the stator 4 is coaxially positioned with respect to the housing space 51. Moreover, one portion (first cooling passage portion) R1 of the cooling passage R is provided in the first housing part 5. The details will be described below.

The second housing part 6 is a disc-shaped member provided to each end surface of the first housing part 5 in the axial direction. Each of the second housing parts 6 is fixed to the first housing part 5 in a liquid-tight manner, by interposing O-rings K1 and K2 between the first housing part 5 and the second housing part 6. Moreover, the bearing 3 is fitted to the center of each second housing part 6. Consequently, the bearing 3 is housed in each second housing part 4. For example, the bearing 3 includes a ball bearing. The rotating shaft 2 (and thus, the rotor 1) is rotatably supported with respect to both second housing parts 6, by the two bearings 3 fitted to both second housing parts 6. One portion (second cooling passage portion) R2 of the cooling passage R is provided in at least one of the two second housing parts 6 (in the present embodiment, only one of the second housing parts 6). The details will be described below.

The lid part 7 is a member provided on the upper end side of the first housing part 5, in which terminals of the power lines 43 and the like are housed.

Figure 20:
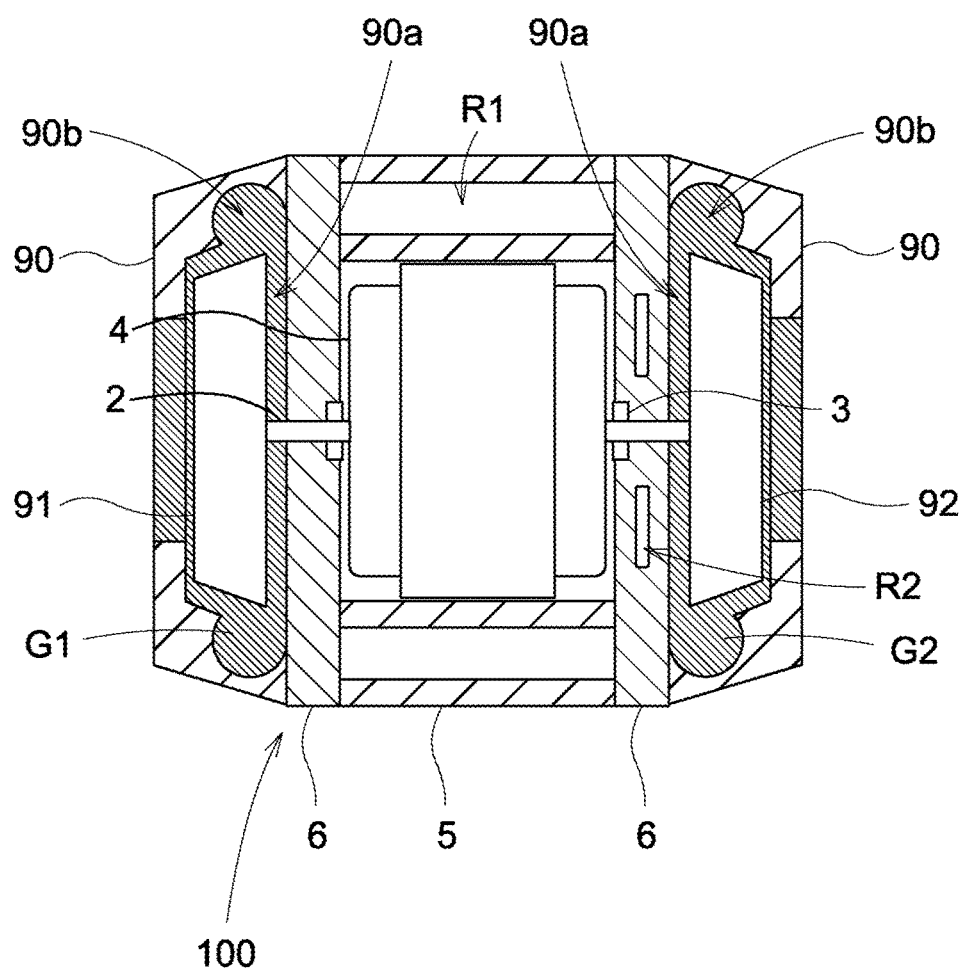
FIG. 20 is a diagram schematically illustrating a configuration example when the rotary electrical machine is applied to a compressor.
Figure 23:
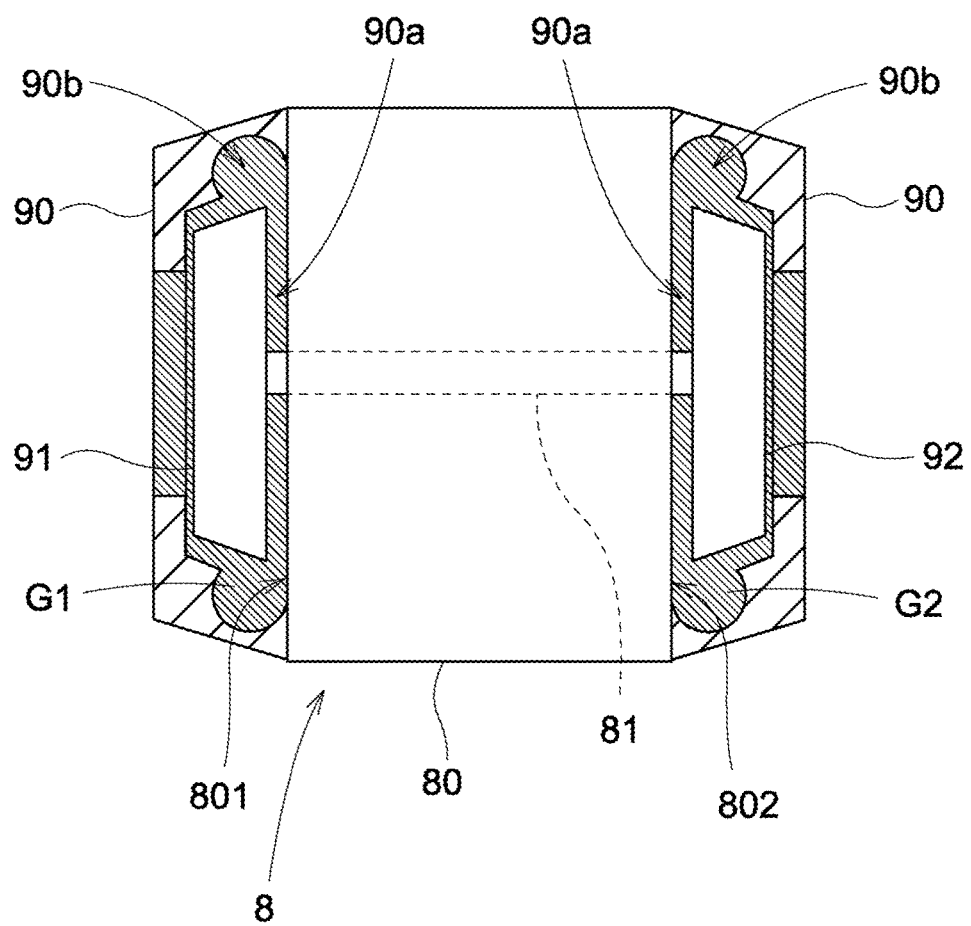
FIG. 23 is a diagram schematically illustrating a configuration example of a compressor.

For example, the rotary electrical machine 100 is mounted on a multistage compressor. The configuration of the multistage compressor is optional. FIG. 20 is a configuration example of the rotary electrical machine 100 mounted on a multistage compressor illustrated in FIG. 23. In this case, a low-pressure side rotary blade 91 is provided on one end side of the rotating shaft 2 that protrudes from the casing part 20, and a high-pressure side rotary blade 92 is provided on the other end side. Moreover, a housing part 90 that houses each of the rotary blades 91 and 92 is fixed to the side surface of each of the second housing parts 6 in an airtight manner. Consequently, the housing space 90a and the flow passage space 90b described above are formed between each housing part 90 and the side surface of each second housing part 6. The operation of the multistage compressor having such a configuration is as described above. When the rotary electrical machine 100 is mounted on such a compressor, the end portion of the rotating shaft 2 at the side provided with the low-pressure side rotary blade 91, is referred to as the "low pressure side", and the end portion of the rotating shaft 2 at the side provided with the high-pressure side rotary blade 92, is referred to as the "high pressure side". In the examples illustrated in FIG. 1, FIG. 3, and the like, the side of the coil end part 42b to which the power line 43 is connected is referred to as the low pressure side. However, this side of the coil end part 42b may also be referred to as the high pressure side.

<1-2. Cooling Passage R>

The cooling passage R is provided in the casing part 20, and by distributing a cooling medium (for example, cooling water) from a cooling medium supply part (not illustrated) to the cooling passage R, the temperature of the main body part 10 is prevented from being excessively increased.

The cooling passage R includes a first cooling passage portion R1 for cooling from the side of the main body part 10, a second cooling passage portion R2 for cooling from the side of the bearing 3 on the high pressure side and the like, and a communication passage portion R3. In the following, the formation of the portions R1, R2, and R3 will be specifically described.

First Cooling Passage Portion R1 and Communication Passage Portion R3

Figure 4:
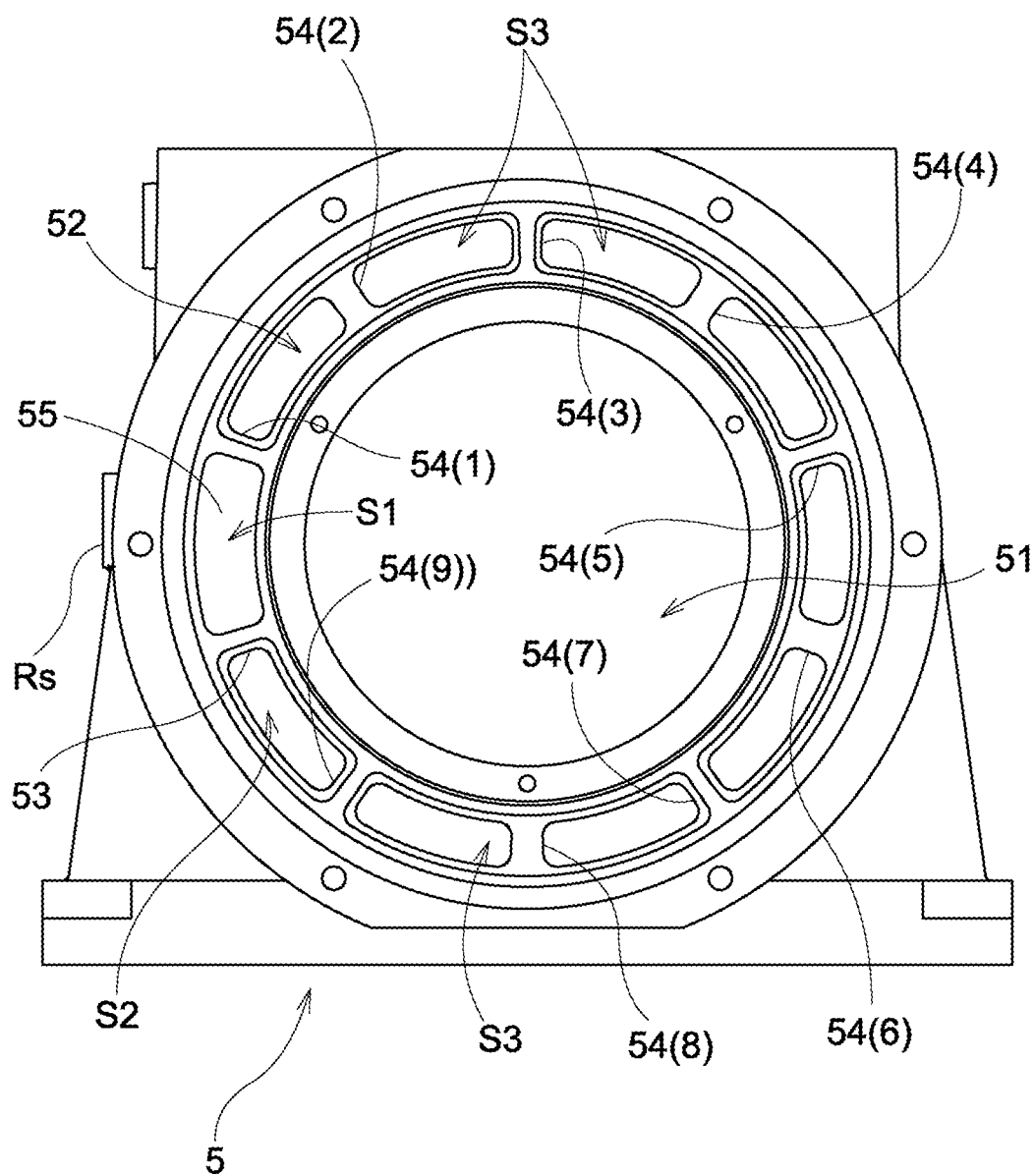
FIG. 4 is a diagram of a first housing part viewed from the high pressure side.
Figure 5:
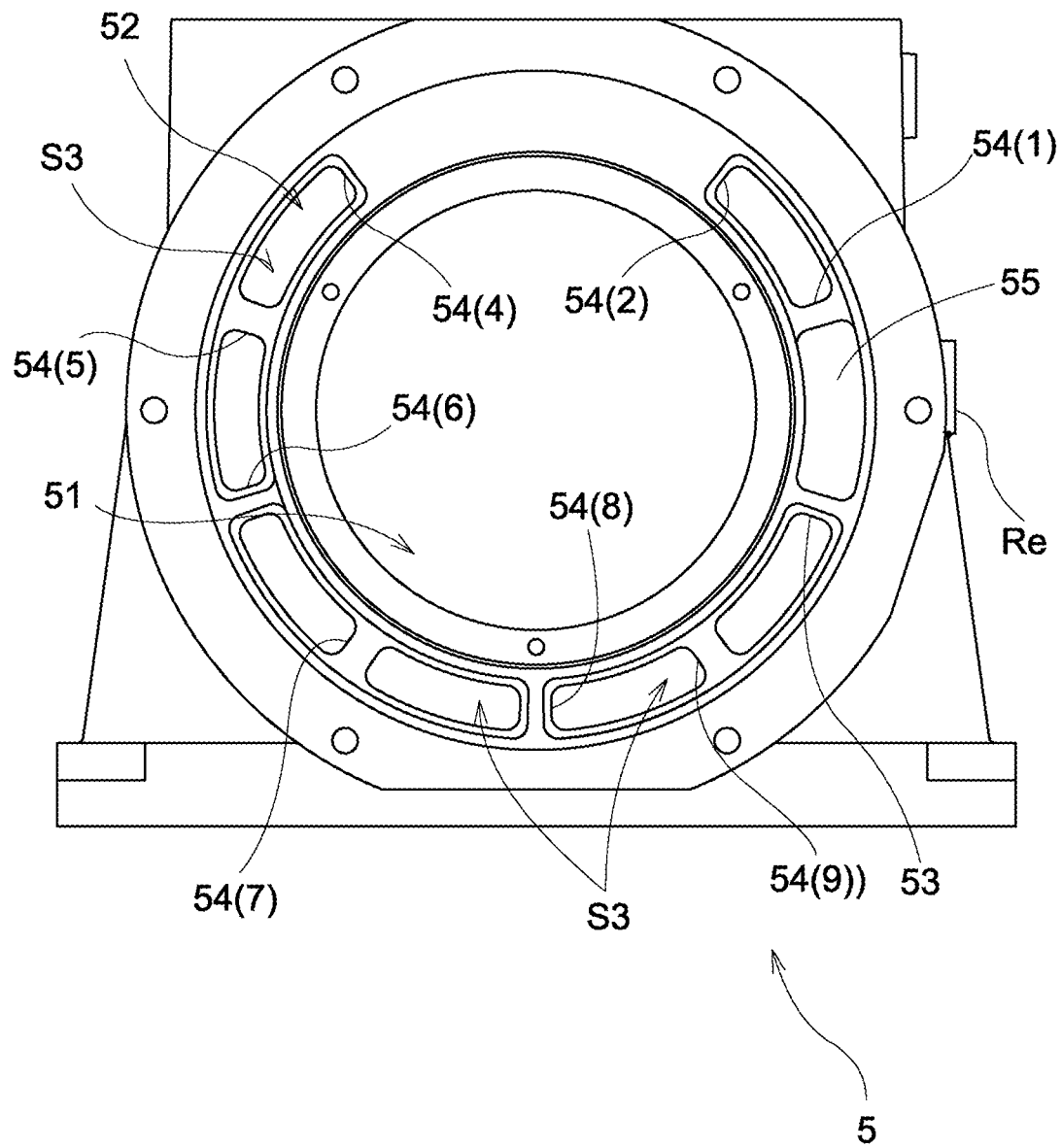
FIG. 5 is a diagram of the first housing part viewed from the low pressure side.
Figure 6:
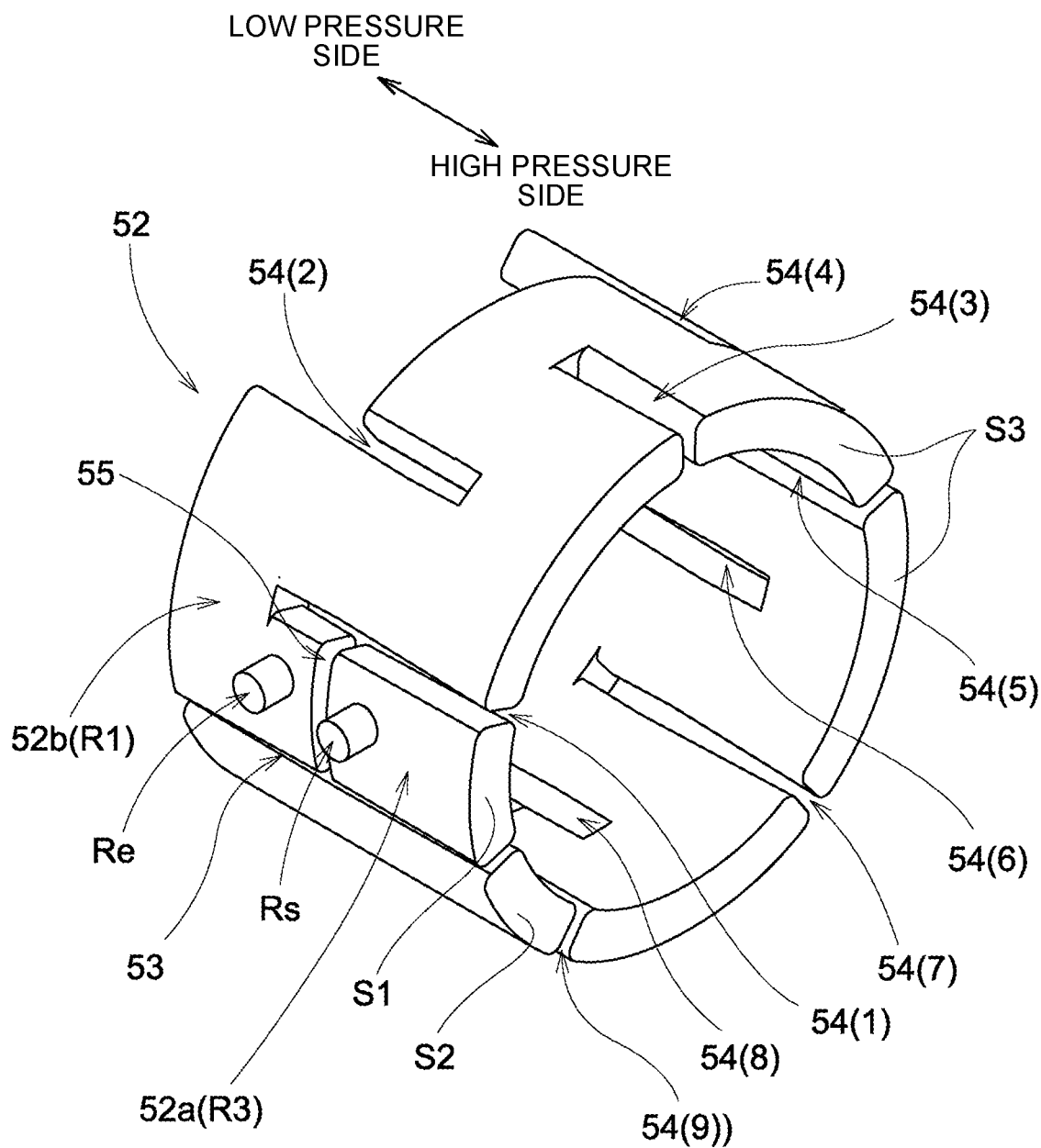
FIG. 6 is a diagram illustrating a hollow space formed inside the first housing part.
Figure 7:
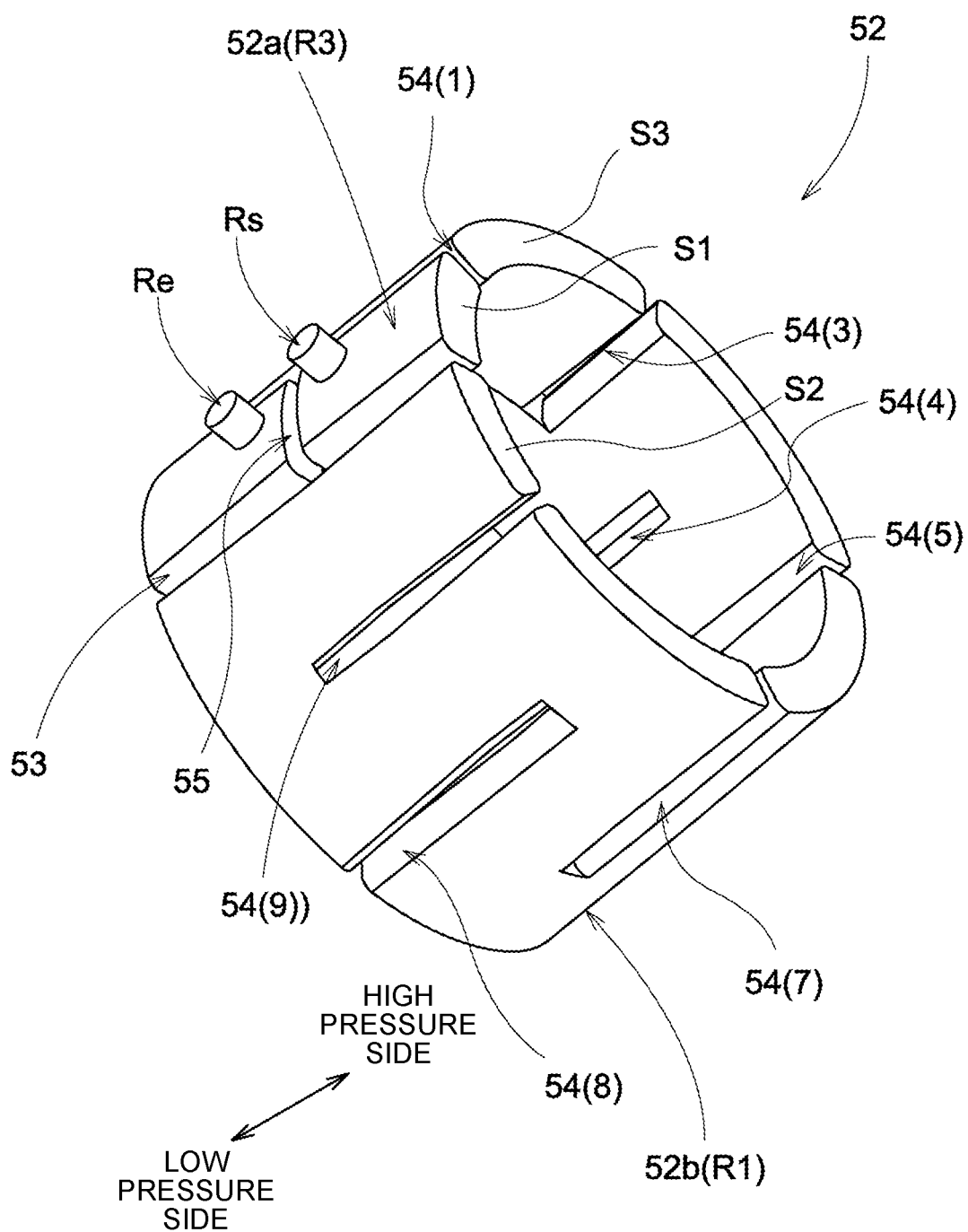
FIG. 7 is a diagram illustrating the hollow space formed inside the first housing part.

The first cooling passage portion R1 and the communication passage portion R3 are provided in the first housing part 5. In the following, the formation of the portions R1 and R3 will be described with reference to FIG. 4 to FIG. 7. FIG. 4 is a diagram of the first housing part 5 viewed from the high pressure side. FIG. 5 is a diagram of the first housing part 5 viewed from the low pressure side. FIG. 6 and FIG. 7 are diagrams each illustrating a hollow space 52 formed inside the first housing part 5.

The first housing part 5 has a substantially cylindrical hollow space (cylindrical space) 52 surrounding the housing space 51 (and thus, the main body part 10 housed therein) from the peripheral direction and having an opened end portion in the axial direction. The inside of the cylindrical space 52 is partitioned by a plurality of partition parts (one long partition part 53 and a plurality of short partition parts 54) and a dividing part 55. The cylindrical space 52 need not have a completely cylindrical shape, and for example, may be formed into a shape that avoids a portion interfering with space 521 through which the power line 43 is inserted or the like.

The long partition part 53 and the short partition parts 54 are portions that extend in the axial direction and that partition the cylindrical space 52 in the peripheral direction, and are arranged at substantially equal intervals in the peripheral direction. Among the partition parts 53 and 54, the long partition part 53 is provided over the entire cylindrical space 52 from one end to the other end in the axial direction, and completely divides the cylindrical space 52 in the peripheral direction. On the other hand, the short partition part 54 extends across one of the end portions of the cylindrical space 52 in the axial direction and the midpoint before reaching the other end portion, and partially divides the cylindrical space 52 (for example, about three-quarters) in the peripheral direction.

There are three or more (nine in the example of the drawings) short partition parts 54. Then, as illustrated in FIG. 6, FIG. 7, and the like, the odd number of the short partition parts 54 are arranged so that the partition part close to the end portion on the high pressure side and the partition part close to the end portion on the low pressure side appear alternately in the peripheral direction. When viewed from the high-pressure side, and when the short partition parts 54 are numbered as a first short partition part 54(1), a second short partition part 54(2), ..., and a ninth short partition part 54(9) in the clockwise direction starting from the long partition part 53, the odd-numbered short partition parts 54(1), 54(3), ..., 54(9) are disposed close to the end portion on the high pressure side, and the even-numbered short partition parts 54(2), 54(4), ..., 54(8) are disposed close to the end portion on the low pressure side.

Thus, as illustrated in FIG. 4, an arc-shaped opening (first opening) S1 is formed between the long partition part 53 and the first short partition part 54(1) on the end surface on the high pressure side of the first housing part 5. Moreover, an arc-shaped opening (second opening) S2 is formed between the long partition part 53 and the ninth short partition part 54(9). Furthermore, an arc-shaped opening S3 the length of which corresponds to the combined length of the first opening S1 and the second opening S2, is formed between each of the odd-numbered short partition parts 54(1), 54(3), ..., and 54(9). On the other hand, as illustrated in FIG. 5, on the end surface of the low pressure side of the first housing part 5, the arc-shaped opening S3 the length of which corresponds to the combined length of the first opening S1 and the second opening S2, is formed between the long partition part 53 and each of the even-numbered short partition parts 54(2), 54(4), ..., 54(8). The openings S1, S2, and S3 that appear on each end surface on the low pressure side and the high pressure side, are closed when the second housing part 6 is fixed to each end surface in a liquid-tight manner.

In this manner, with the first opening S1 and the second opening S2 at both ends, the cylindrical space 52 is formed with a zigzag-shaped passage, that is, a meandering passage in which a portion that extends in the axial direction by being guided by each short partition part 54, and a U-shaped portion that passes around the end of each short partition part 54 and that folds back 180 degrees appear alternately.

The dividing part 55 is a portion that extends between the long partition part 53 and the first short partition part 54(1) in the peripheral direction, and divides the space between the long partition part 53 and the first short partition part 54(1) in the axial direction. Consequently, the meandering passage formed in the cylindrical space 52 is divided into a short portion 52a that extends from the first opening S1 to the dividing part 55, and a meandering portion 52b that extends from the second opening S2 to the dividing part 55. The short portion 52a configures the communication passage portion R3 in the cooling passage R, and the latter meandering portion 52b configures the first cooling passage portion R1 in the cooling passage R.

Second Cooling Passage Portion R2

The second cooling passage portion R2 is provided in the second housing part 6 on the high pressure side. In the following, to distinguish between the second housing parts 6 on the high pressure side and the low pressure side, the former is referred to as a "high-pressure side second housing part 6o" and the latter is referred to as a "low-pressure side second housing part 6i".

Figure 8:
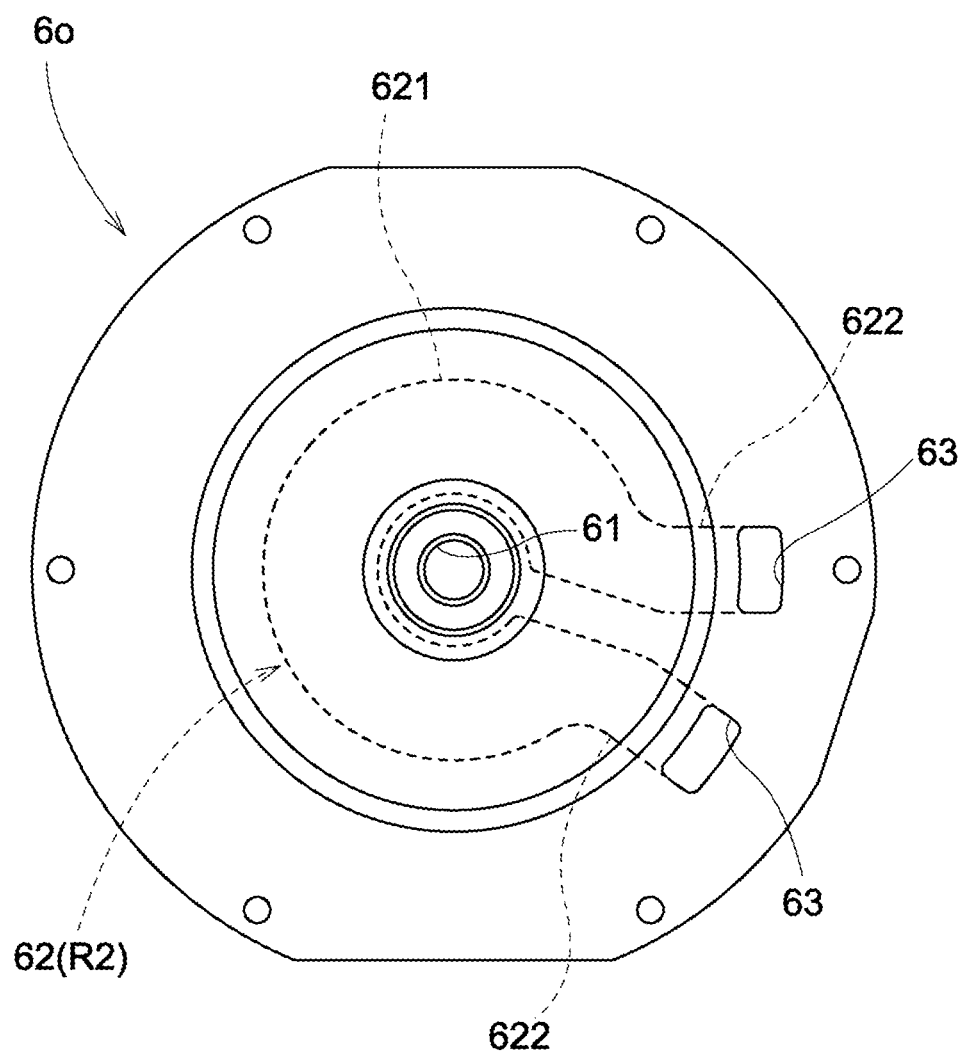
FIG. 8 is a diagram of a second housing part on the high pressure side, viewed from a side where the second housing part on the high pressure side is fixed to the first housing part.

The configuration of the second cooling passage portion R2 provided on the high-pressure side second housing part 6o will be described with reference to FIG. 8. FIG. 8 is a diagram of the high-pressure side second housing part 6o viewed from a side where the high-pressure side second housing part 6o is fixed to the first housing part 5.

The high-pressure side second housing part 6o has a C-shaped hollow space (C-shaped space) 621 that substantially completely surrounds a housing through hole 61 from the peripheral direction when viewed from the axial direction. Each end portion of the C-shaped space 621 communicates with one end of a straight hollow space (extension space) 622 that extends in the radial direction. Moreover, the other end of each extension space 622 communicates with an opening 63 provided to the surface at a side that faces the first housing part 5 in the high-pressure side second housing part 6o. A portion 62 formed by the C-shaped space 621 and each extension space 622 configures the second cooling passage portion R2 in the cooling passage R.

Overall Configuration of Cooling Passage R

Figure 9:
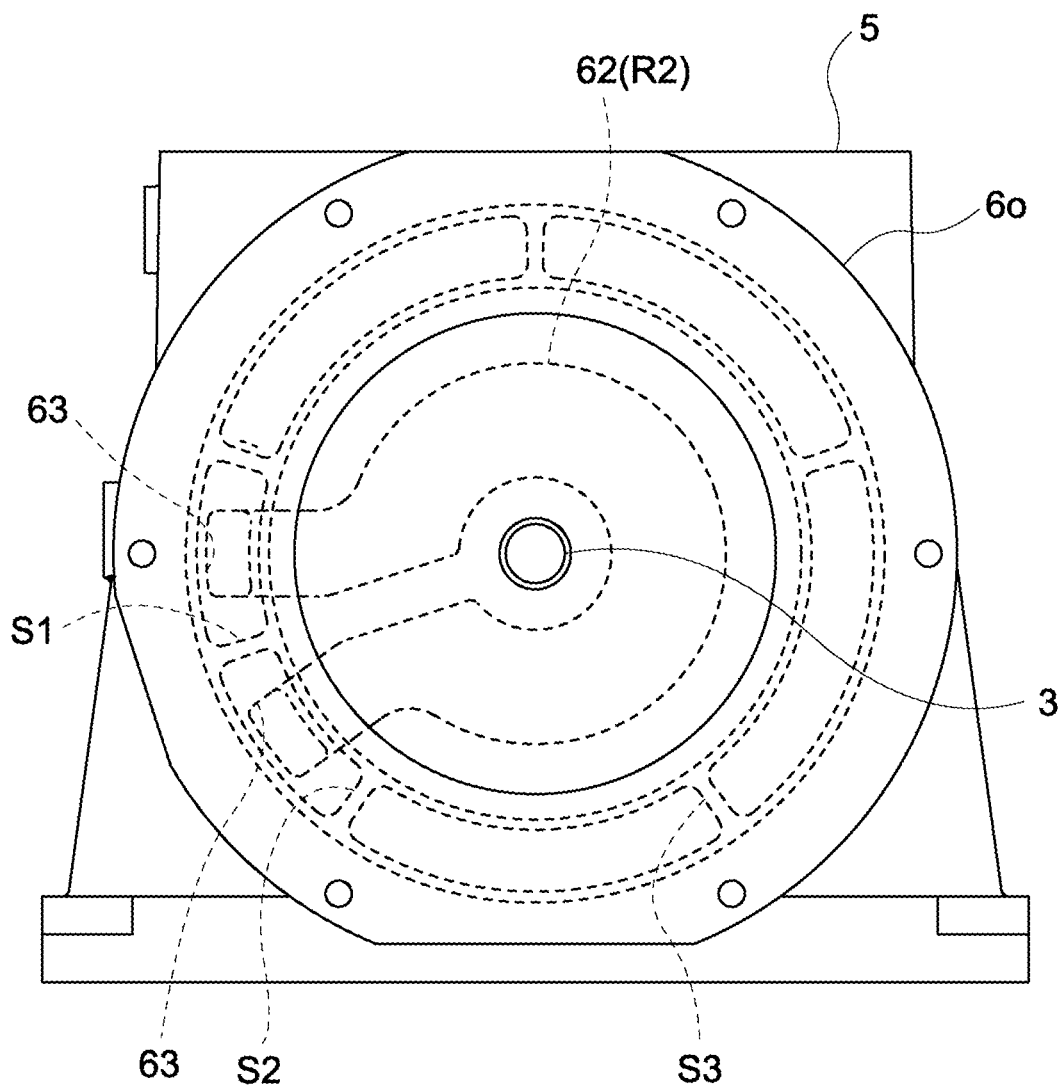
FIG. 9 is a diagram of a casing part viewed from the high pressure side.
Figure 10:
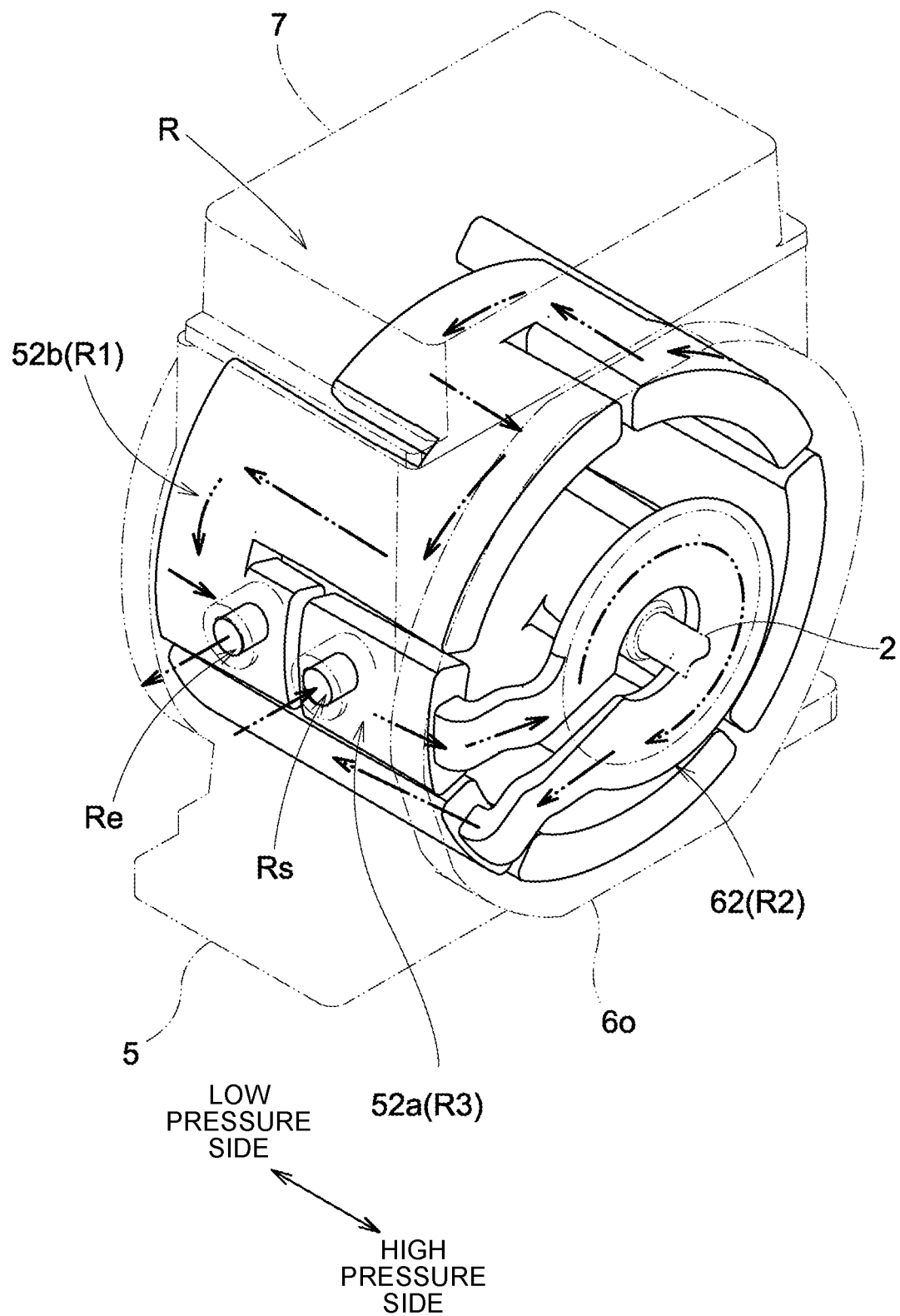
FIG. 10 is a diagram illustrating an overall configuration of a cooling passage.

Next, an overall configuration of the cooling passage R will be described with reference to FIG. 9 and FIG. 10. FIG. 9 is a diagram of the casing part 20 viewed from the high pressure side. FIG. 10 is a diagram illustrating an overall configuration of the cooling passage R.

As described above, the openings S1, S2, and S3 that appear on each end surface on the low-pressure side and the high-pressure side of the first housing part 5 are closed, when the high-pressure side second housing part 6o or the low-pressure side second housing part 6i is fixed to each end surface in a liquid-tight manner.

However, the two openings 63 that configure each end portion of the second cooling passage portion R2 are provided to the side surface of the high-pressure side second housing part 6o. In a state in which the high-pressure side second housing part 6o is fixed to the end surface on the high pressure side of the first housing part 5, each of the openings 63 is disposed at a position communicating with each of the first opening S1 and the second opening S2 on the end surface. Thus, when the high-pressure side second housing part 6o is fixed to the end surface on the high pressure side of the first housing part 5, the first opening S1 that is one end of the communication passage portion R3, communicates with one end of the second cooling passage portion R2, and the second opening S2 that is one end of the first cooling passage portion R1, communicates with the other end of the second cooling passage portion R2.

Consequently, the communication passage portion R3, the second cooling passage portion R2, and the first cooling passage portion R1 are connected in series in this order, and form a single cooling passage R that does not branch off in the middle (that is, without branching).

At each end portion of the cooling passage R, an inlet Rs or an outlet Re for cooling medium is provided. That is, the inlet Rs for cooling medium is provided to the end portion on the communication passage portion R3 side of the cooling passage R, and the outlet Re for cooling medium is provided to the end portion on the first cooling passage portion R1 side.

In such a configuration, the cooling medium introduced from the inlet Rs flows through the communication passage portion R3 into the second cooling passage portion R2 and flows therethrough. In the inside of the high-pressure side second housing part 6o, the second cooling passage portion R2 is provided so as to substantially completely surround the housing through hole 61 in which the bearing 3 is housed from the peripheral direction. Hence, when the cooling medium passes therethrough, the heat is dissipated from the side of the bearing 3 on the high pressure side.

Moreover, because the second cooling passage portion R2 is provided in the high-pressure side second housing part 6o, and the cooling medium passes therethrough, the high-pressure side second housing part 6o functions as a thermal insulation member. That is, for example, when the rotary electrical machine 100 is mounted on a multistage compressor (FIG. 20), hot air G2 that is compressed and heated by the rotation of the high-pressure side rotary blade 92 is present outside the casing part 20 on the high pressure side of the rotating shaft 2 as a heat source. The heat transferred from the air G2 is transferred from the side wall of the high-pressure side second housing part 6o (specifically, the side wall portion that configures a part of the housing space 90a and the flow passage space 90b) to the inside of the high-pressure side second housing part 6o, and the temperature of the high-pressure side second housing part 6o is increased by the thermal resistance of the transfer passage (heat transfer passage). However, in this example, the second cooling passage portion R2 is provided in the high-pressure side second housing part 6o, where the cooling medium is distributed. Therefore, the heat transfer passage to the cooling passage R becomes shorter than that of the low-pressure side second housing part 6i, resulting in lower thermal resistance. Hence, it is possible to effectively suppress the temperature rise of the high-pressure side second housing part 6o. In other words, the heat transferred from the hot air G2 serving as the heat source, is blocked by the high-pressure side second housing part 6o, so to speak. Moreover, a part of the heat transferred from the air G2 is absorbed by the cooling medium. Hence, it is also possible to effectively suppress the temperature rise of the high-pressure side second housing part 6o. Furthermore, the heat transfer passage from the bearing 3 to the cooling passage R also becomes shorter than that of the low-pressure side second housing part 6i, resulting in low thermal resistance. Hence, it is also possible to suppress the temperature rise of the bearing 3 housed in the high-pressure side second housing part 6o.

The cooling medium that flows through the second cooling passage portion R2 and that has removed heat from the side of the bearing 3 on the high pressure side and the like, then flows into the first cooling passage portion R1, and flows therethrough. In the inside of the first housing part 5, the first cooling passage portion R1 is provided as a meandering passage that covers the substantially whole of the peripheral wall portion surrounding the housing space 51. In other words, by repeating the meandering in which the cooling medium flows in the axial direction and turns back at the end portion, the substantially whole of the peripheral wall portion surrounding the housing space 51 is scanned by the cooling medium. Consequently, the heat is sufficiently dissipated from the outer peripheral side of the main body part 10 (more specifically, the outer peripheral side of the stator 4). The cooling medium that has flowed through the first cooling passage portion R1 is led out from the outlet Re.

Figure 21A:
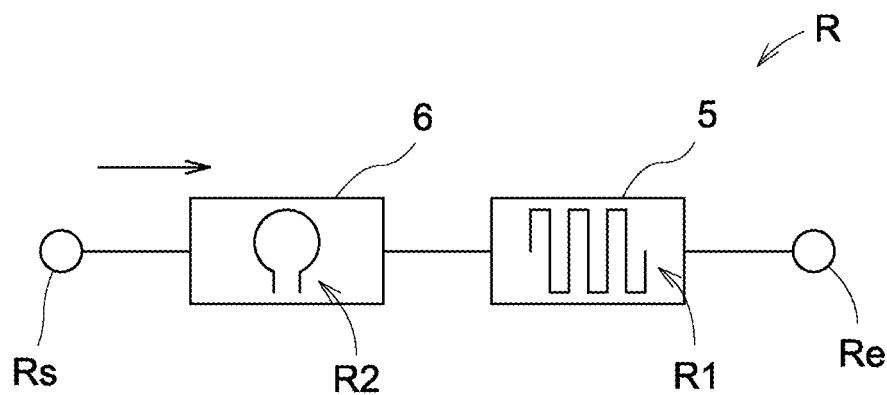
FIG. 21A is a diagram schematically illustrating the cooling passage.
Figure 21B:
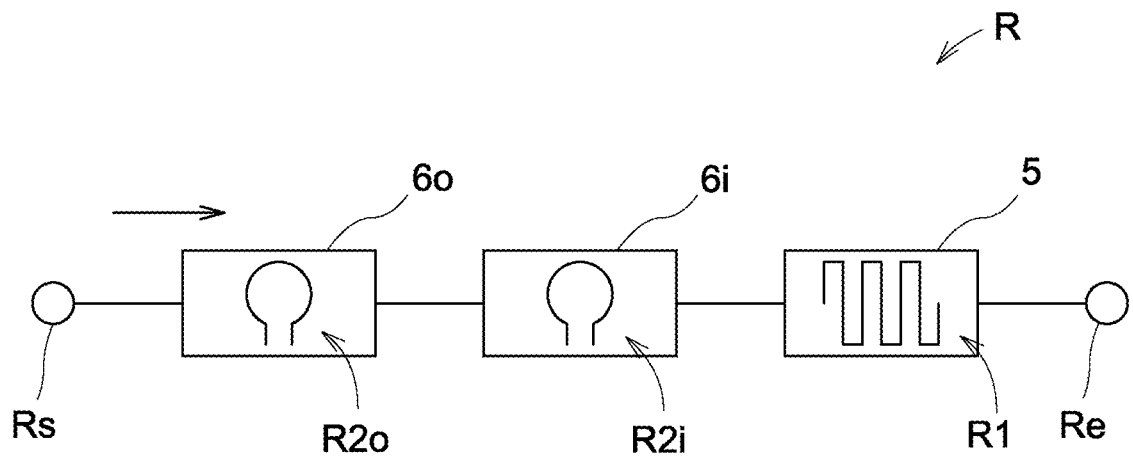
FIG. 21B is a diagram schematically illustrating the cooling passage.

FIG. 21A and FIG. 21B each schematically illustrate the configuration of the cooling passage R according to the present embodiment. As illustrated in the examples, the cooling passage R includes the first cooling passage portion R1 that passes through the inside of the first housing part 5, and the second cooling passage portion R2 that passes through the inside of one second housing part 6 (high-pressure side second housing part 6o). Hence, the heat is dissipated both from the outer peripheral side of the main body part 10 and the side of the bearing 3 on the high pressure side, by the cooling medium that flows through each of the cooling passage portions R1 and R2. Thus, the heat can be sufficiently dissipated both from the outer peripheral side of the main body part 10 and the side of the bearing 3 on the high pressure side. Moreover, the cooling passage R includes the second cooling passage portion R2 that passes through the inside of the high-pressure side second housing part 6o. Hence, the high-pressure side second housing part 6o can function as a thermal insulation member. That is, it is possible to block at least a part of the heat transferred from the heat source G2 that is present outside the casing part 20 on the high pressure side of the rotating shaft 2, and suppress the temperature rise of the main body part 10 (particularly, the bearing 3 on the high pressure side).

According to the thermal analysis simulation conducted by the inventors to verify the effects of providing the second cooling passage portion R2, when the SPM motor is output, the temperature of the bearing 3 on the high pressure side when the second cooling passage portion R2 is not provided was 125° C., and the temperature of the bearing 3 when the second cooling passage portion R2 is provided was 115° C. That is, by providing the second cooling passage portion R2, it is possible to effectively suppress the temperature rise by 10° C. When the bearing 3 is placed under high temperature of 125° C., there is a concern that the product life of the bearing 3 is significantly reduced. However, by reducing the temperature by about 10° C., it is possible to prevent such a situation, and guarantee the product life of the bearing 3.

Moreover, the cooling passage R according to the present embodiment is a single (unicursal) passage extending from the inlet Rs to the outlet Re and not branching off in the middle. Therefore, the flow rate of the cooling medium at each portion of the cooling passage R is kept constant, even if the condition (pressure and the like) of the cooling medium supplied from the inlet Rs is changed. That is, it is possible to allow the cooling medium to flow throughout the cooling passage R at a constant flow rate. Thus, the thermal insulation properties of the high-pressure side second housing part 6o are maintained in a stable manner. That is, it is possible to sufficiently suppress the temperature rise of the bearing 3 on the high pressure side, by stably blocking at least a part of the heat transferred from the heat source G2.

Figure 22A:
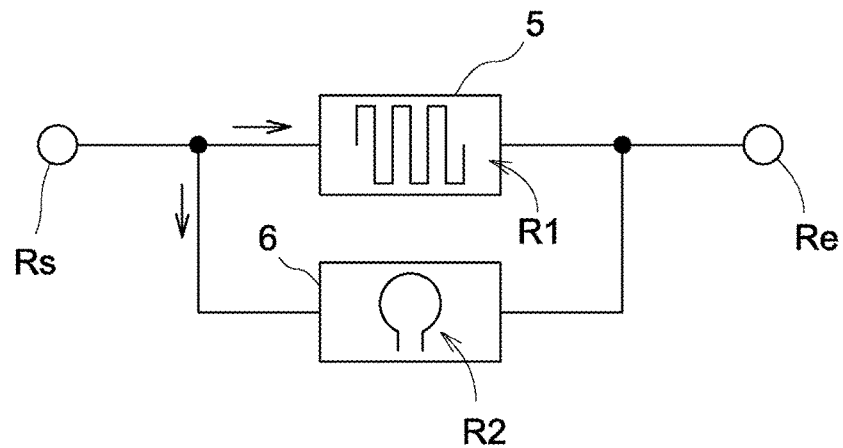
FIG. 22A is a diagram schematically illustrating a cooling passage used as a comparative example.

For example, as illustrated in FIG. 22A, it is also conceivable to use a cooling passage branching into the portion R1 that passes through the inside of the first housing part 5, and the portion R2 that passes through the inside of the second housing part 6, in the middle of the cooling passage extending from the inlet Rs to the outlet Re. In such a configuration also, the heat is dissipated both from the outer peripheral side of the main body part 10 and the side of the bearing 3. However, in such a configuration, if the condition of the cooling medium supplied from the inlet Rs is changed, the flow rate and the like at each split flow portion in the cooling passage vary according to the flow passage resistance of the portion. Thus, it is difficult to maintain the thermal insulation properties of the high-pressure side second housing part 6o in a stable manner. In other words, with a cooling passage that branches off in the middle as illustrated in FIG. 21A, it is not possible to obtain the same effects as those of the cooling passage R according to the present embodiment.

Moreover, in the cooling passage R according to the present embodiment, as illustrated in FIG. 21A, the second cooling passage portion R2 is disposed on the upstream side of the first cooling passage portion R1. Hence, the cooling from the bearing 3 side is given priority to the cooling from the outer peripheral side of the main body part 10. In other words, the cooling medium passes through the second cooling passage portion R2 before passing through the first cooling passage portion R1. With this configuration, the cooling medium flows through the second cooling passage portion R2 at a sufficiently low temperature. Hence, it is possible to achieve high thermal insulation properties in the high-pressure side second housing part 6o. Moreover, with this configuration, the cooling medium that flows through the cooling passage R removes heat from the bearing 3 as the cooling medium passes through the second cooling passage portion R2, and then passes through the first cooling passage portion R1 in a state in which the temperature of the cooling medium is somewhat increased by the heat. While passing through the first cooling passage portion R1, the cooling medium removes heat from the outer peripheral side of the main body part 10. In general, the temperature of the outer periphery of the main body part 10 is higher than that of the bearing 3. However, in this example, the cooling medium flows through the second cooling passage portion R2 near the relatively low-temperature bearing 3 at a sufficiently low temperature, and flows through the first cooling passage portion R1 near the outer periphery of the relatively high-temperature main body part 10 at a temperature somewhat increased from a sufficiently low state. Hence, the temperature difference between the cooling medium and the object to be cooled is sufficiently large in the cooling passage portions R1 and R2. Thus, the heat dissipation performance from the side of the bearing 3 and the heat dissipation performance from the outer peripheral side of the main body part 10 are sufficiently high. Moreover, because the cooling medium flows near the bearing 3 at a sufficiently low temperature, it is possible to prevent the deterioration of lubricant (such as grease) used for the bearing 3.

Figure 22B:
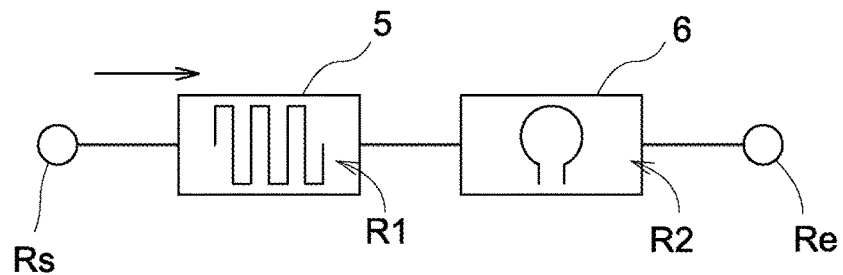
FIG. 22B is a diagram schematically illustrating a cooling passage used as a comparative example.

For example, as illustrated in FIG. 22B, it is also conceivable to use a cooling passage in which the second cooling passage portion R2 is provided on the downstream side of the first cooling passage portion R1, that is, a cooling passage in which the cooling from the outer peripheral side of the main body part 10 is given priority to the cooling from the side of the bearing 3. However, in such a configuration, the cooling medium that flows through the cooling passage passes through the first cooling passage portion R1 before passing through the second cooling passage portion R2. In other words, the cooling medium that flows through the cooling passage removes heat from the outer peripheral side of the main body part 10 while passing through the first cooling passage portion R1, and passes through the second cooling passage portion R2 while the temperature of the cooling medium is increased by the heat. In this case, the temperature of the cooling medium that flows through the second cooling passage portion R2 is not sufficiently low, and the thermal insulation properties in the high-pressure side second housing part 6o is lowered. Moreover, the cooling medium flows near the outer periphery of the relatively high-temperature main body part 10 at a sufficiently low temperature, and flows near the relatively low-temperature bearing 3 at a temperature raised from a sufficiently low state. Hence, the temperature difference between the cooling medium and the bearing 3 is reduced in the second cooling passage portion R2. Thus, the heat dissipation performance from the side of the bearing 3 is also lowered. In this manner, with the cooling passage in which the second cooling passage portion R2 is provided on the downstream side as illustrated in FIG. 22B, it is not possible to obtain the same effects as those of the cooling passage R according to the present embodiment.

<1-3. Effects>

The rotary electrical machine 100 according to the present embodiment has the main body part 10 including the rotor 1 and the stator 4, and the casing part 20 that houses the main body part 10. In this example, the casing part 20 includes the first housing part 5 that surrounds the main body part 10 from the peripheral direction, and the second housing part 6 that houses the bearing 3 for rotatably supporting the rotating shaft 2. Also, the casing part 20 is formed with the cooling passage R extending from the inlet Rs for the cooling medium to the outlet Re for the cooling medium and not branching off in the middle. This cooling passage R includes the first cooling passage portion R1 that passes through the inside of the first housing part 5 and the second cooling passage portion R2 that passes through the inside of the second housing part 6. With this configuration, not only the first cooling passage portion R1 is provided in the inside of the first housing part 5, but the second cooling passage portion R2 is also provided in the inside of the second housing part 6. Thus, for example, when a heat source (for example, hot air) is present outside the casing part 20 on the shaft end side of the rotating shaft 2, the second housing part 6 can block at least a part of the heat transferred from the heat source. That is, the second housing part 6 can function as a thermal insulation member. Moreover, when the cooling medium is distributed through the first and second cooling passage portions R1 and R2 provided inside each of the first and second housing parts 5 and 6, the heat is dissipated both from the outer peripheral side of the main body part 10 and the side of the bearing 3. Thus, it is also possible to suppress the temperature rise of the rotor 1, the stator 4, and the bearing 3. Furthermore, in this example, the cooling passage R is a single passage extending from the inlet Rs to the outlet Re and not branching off in the middle. Hence, it is possible to allow the cooling medium to flow throughout the cooling passage R at a constant flow rate, and maintain stable thermal insulation properties. Thus, it is possible to sufficiently suppress the temperature rise of the rotary electrical machine 100.

Moreover, in the cooling passage R of the rotary electrical machine 100 according to the present embodiment, the second cooling passage portion R2 is provided on the upstream side of the first cooling passage portion R1. With this configuration, the cooling medium flows through the second cooling passage portion R2 at a sufficiently low temperature. Hence, it is possible to achieve high thermal insulation properties in the second housing part 6. Moreover, with this configuration, the cooling medium flows near the bearing 3 the temperature of which is generally lower than that of the outer periphery of the main body part 10 at a sufficiently low temperature, and then flows near the outer periphery of the main body part 10 the temperature of which is generally higher than that of the bearing 3, at a temperature somewhat increased from the sufficiently low temperature. Hence, the temperature difference between the cooling medium and the object to be cooled is sufficiently large in both cooling passage portions. Thus, the heat dissipation performance from the side of the bearing 3 and the heat dissipation performance from the outer peripheral side of the main body part 10 are sufficiently high.

Moreover, as the rotary electrical machine 100 according to the present embodiment that includes the inner-rotor type main body part 10 in which the rotor 1 is disposed inside the stator 4, it is possible to sufficiently suppress the temperature rise of the stator 4 by dissipating heat from the outer peripheral side of the main body part 10. Furthermore, by sufficiently dissipating heat not only from the outer peripheral side of the main body part 10 but also from the side of the bearing 3, and by also suppressing the bearing 3 from being heated by a heat source near the bearing 3, it is possible to sufficiently suppress the temperature rise of the bearing 3. By sufficiently suppressing the temperature rise of the bearing 3, it is also possible to dissipate the heat of the rotor 1 from the side of the bearing 3. That is, the heat of the rotor 1 can be dissipated from the side of the bearing 3 via the rotating shaft 2. Consequently, it is also possible to suppress the temperature rise of the rotor 1 (for example, temperature rise by the heat generation of the magnet due to eddy current loss). In this manner, by suppressing the temperature rise of the stator 4, the bearing 3, and the rotor 1, it is possible to prevent the performance and the product life of the parts from being lowered. Hence, it is possible to sufficiently guarantee the performance and product life of the rotary electrical machine 100.

Moreover, the first housing part 5 of the rotary electrical machine 100 according to the present embodiment has the cylindrical hollow space 52 surrounding the main body part 10 from the peripheral direction and having an opened end portion in the axial direction. The opened end portion in the hollow space 52 (specifically, the openings S1 to S3) is closed by the second housing part 6. Then, one portion 52b of the hollow space 52 forms the first cooling passage portion R1. Thus, the cooling medium that passes through the first cooling passage portion R1 comes into contact with the second housing part 6 upon reaching the openings S1 to S3. In other words, with this configuration, a part of the cooling medium that passes through the first cooling passage portion R1 can be brought into contact with the second housing part 6. Hence, it is possible to allow the cooling medium that passes through the first cooling passage portion R1 to remove heat from the second housing part 6. Thus, it is possible to enhance the thermal insulation properties of the second housing part 6 in particular, and further promote the heat dissipation from the side of the bearing 3.

Moreover, in the rotary electrical machine 100 according to the present embodiment, the second housing part 6 is provided on one side and the other side in the axial direction of the first housing part 5, and the second cooling passage portion R2 is provided to only one of the two second housing parts 6. In the example of the drawings, the two second housing parts 6 have the same size as each other. However, the two second housing parts 6 may also be designed such that the size of the second housing part 6 on the side where the second cooling passage portion R2 is not provided may be reduced than that of the other second housing part 6. In this way, it is possible to reduce the overall size of the rotary electrical machine 100.

In particular, the rotary electrical machine 100 according to the present embodiment includes the second cooling passage portion R2 in the second housing part 6 (high-pressure side second housing part 6o) disposed on the high pressure side. For example, when the rotary electrical machine 100 is mounted on a multistage compressor (FIG. 20), the second housing part 6o can block at least a part of the heat transferred from the heat source G2, by providing the second cooling passage portion R2 on the second housing part 6 disposed on the high pressure side, where the heat source (compressed hot air) G2 of relatively high temperature is present outside the casing part 20 on the high pressure side of the rotating shaft 2.

Moreover, in the rotary electrical machine 100 according to the present embodiment, the inlet Rs and the outlet Re are both provided in the first housing part 5. Hence, the cooling medium introduced from the inlet Rs passes through the communication passage portion R3 provided in the first housing part 5, and is introduced to the second cooling passage portion R2 provided in the second housing part 6. With this configuration, for example, compared to when the communication passage portion R3 is configured by external piping, it is possible to reduce the overall size. Moreover, it is also possible to simplify the configuration, and reduce the number of locations to be joined in a liquid-tight manner.

2. Second Embodiment

<2-1. Basic Configuration of Rotary Electrical Machine>

Figure 11:
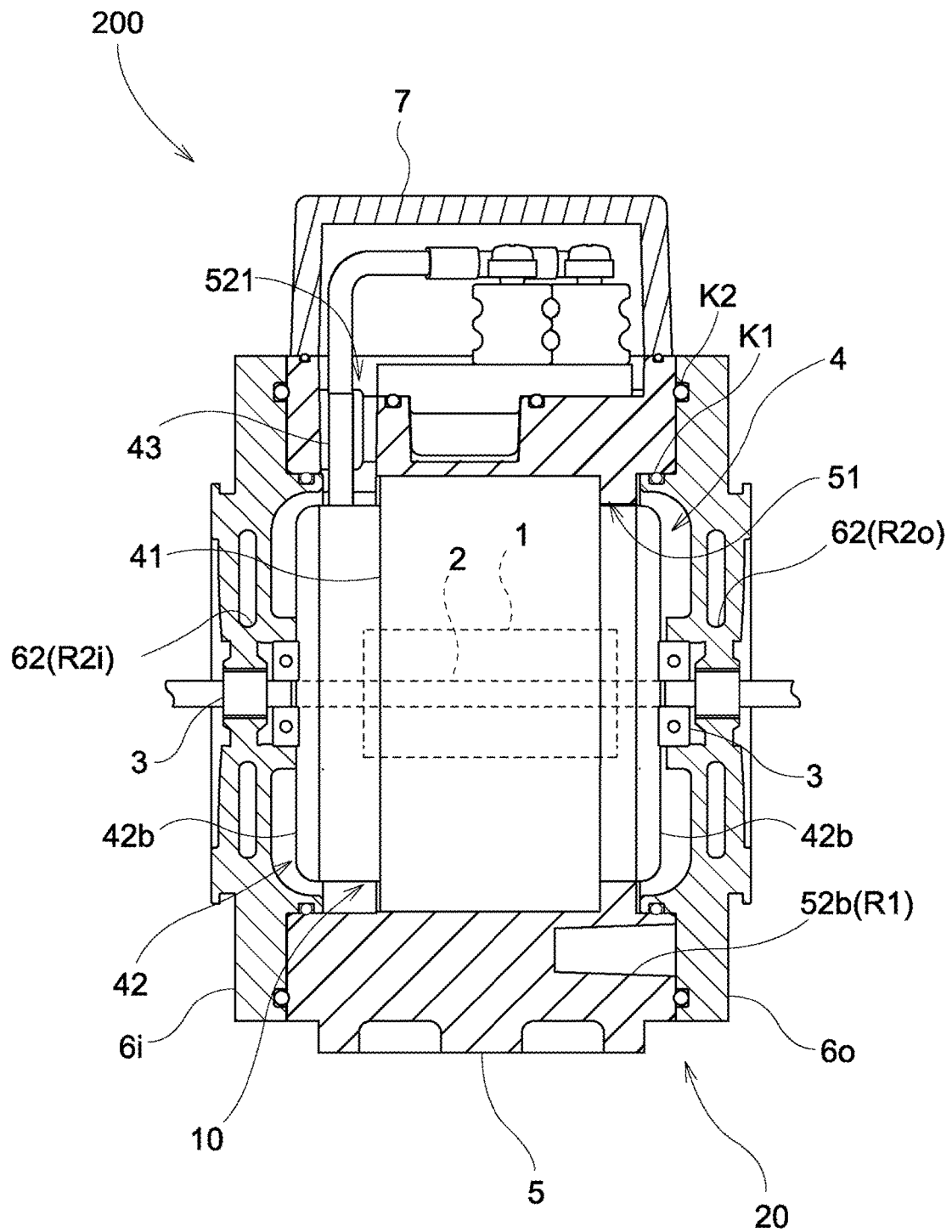
FIG. 11 is a diagram of a rotary electrical machine according to a second embodiment viewed from the direction of the arrow B in FIG. 1.

The basic configuration of a rotary electrical machine 200 according to a second embodiment will be described with reference to FIG. 11. FIG. 11 is a diagram of the rotary electrical machine 200 viewed from a direction of an arrow B in FIG. 1. However, similar to FIG. 3, FIG. 11 also illustrates a cross-section of the casing part 20. In the following description, the same components as those described in the first embodiment are denoted by the same reference numerals and the description thereof will be omitted.

Similar to the rotary electrical machine 100 according to the first embodiment, the rotary electrical machine 200 has the main body part 10 including the rotor 1, the rotating shaft 2, the bearing 3, the stator 4, and the like. The configuration of the main body part 10 is as described above.

Moreover, similar to the rotary electrical machine 100 according to the first embodiment, the rotary electrical machine 200 has the casing part 20 including the first housing part 5, the two second housing parts 6, the lid part 7, and the like. The basic configuration of the casing part 20 is the same as that in the first embodiment. However, the configuration of the cooling passage R to be formed differs from that in the first embodiment. The difference will be described below.

<2-2. Cooling Passage R>

The cooling passage R has the first cooling passage portion R1 for cooling from the side of the main body part 10, a second cooling passage portion (high-pressure side second cooling passage portion) R2o for cooling from the side of the bearing 3 on the high pressure side and the like, and the communication passage portion R3. Moreover, the cooling passage R has another second cooling passage portion (low-pressure side second cooling passage portion) R2i for cooling from the side of the bearing 3 on the low pressure side and the like, and a communication passage portion (additional communication passage portion) R4 for connecting the two second cooling passage portions R2o and R2i to each other. In the following, the formation of each of the portions R1 to R4 will be specifically described.

First Cooling Passage Portion R1, Communication Passage Portion R3, and Additional Communication Passage Portion R4

Figure 12:
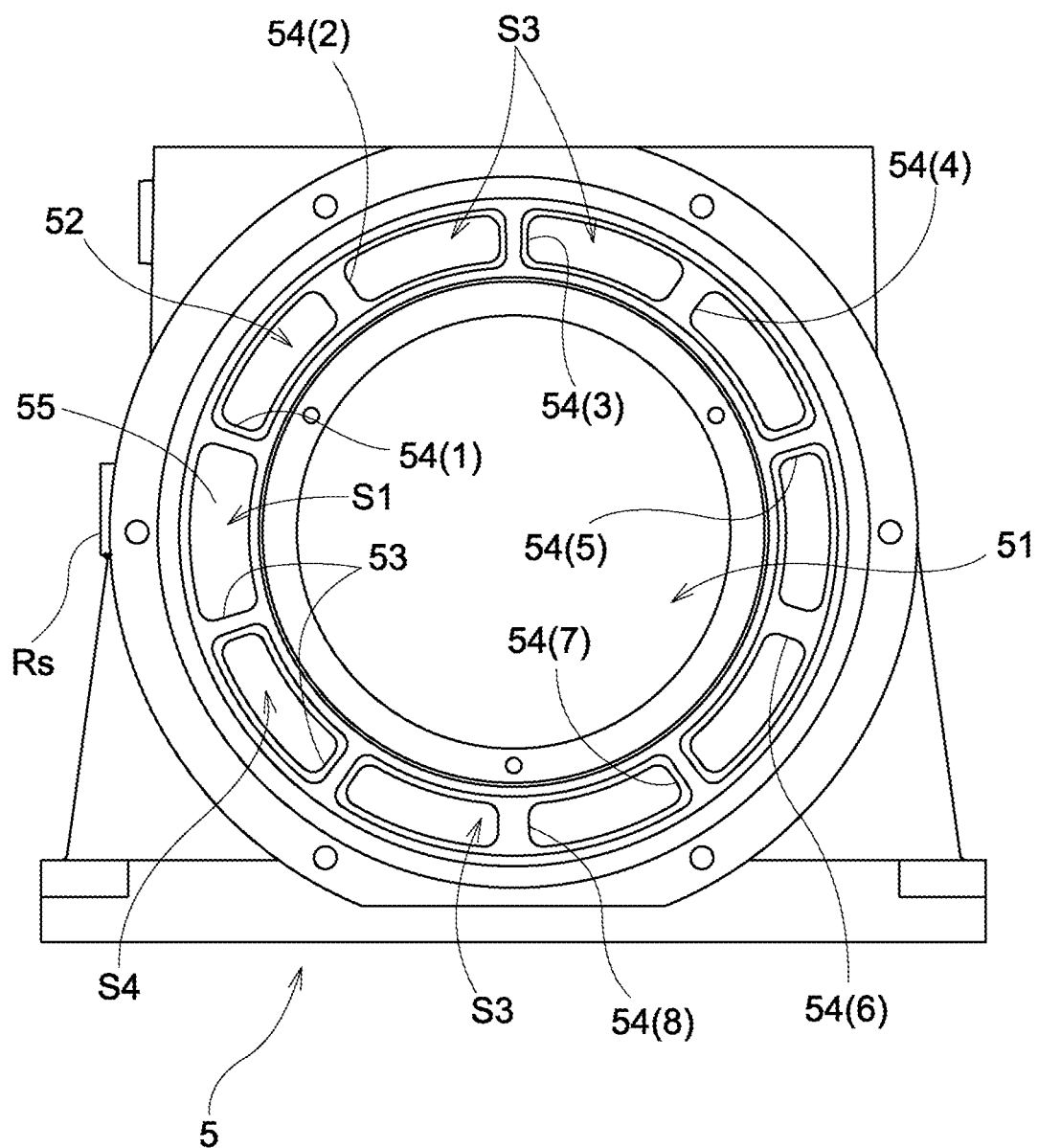
FIG. 12 is a diagram of the first housing part viewed from the high pressure side.
Figure 13:
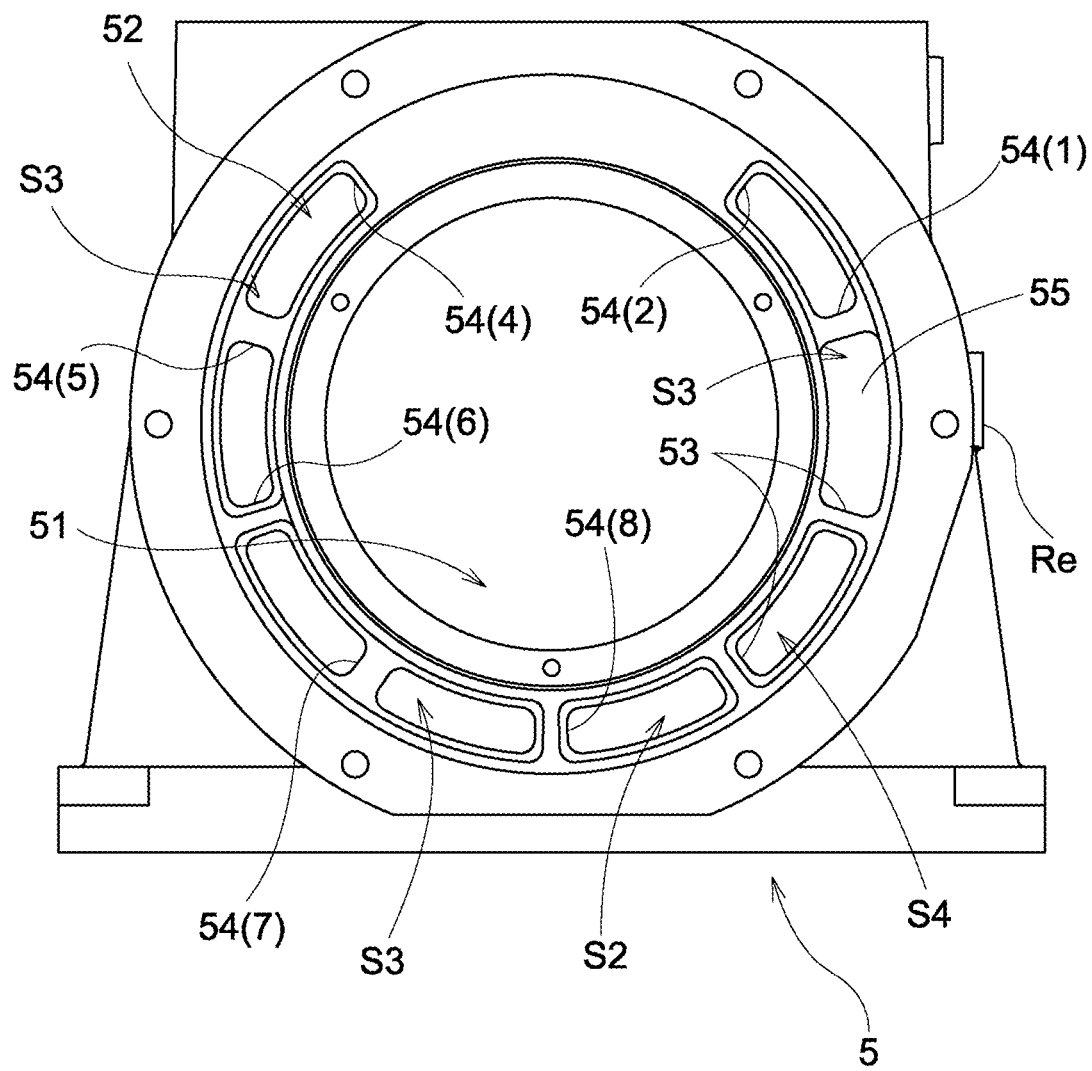
FIG. 13 is a diagram of the first housing part viewed from the low pressure side.
Figure 14:
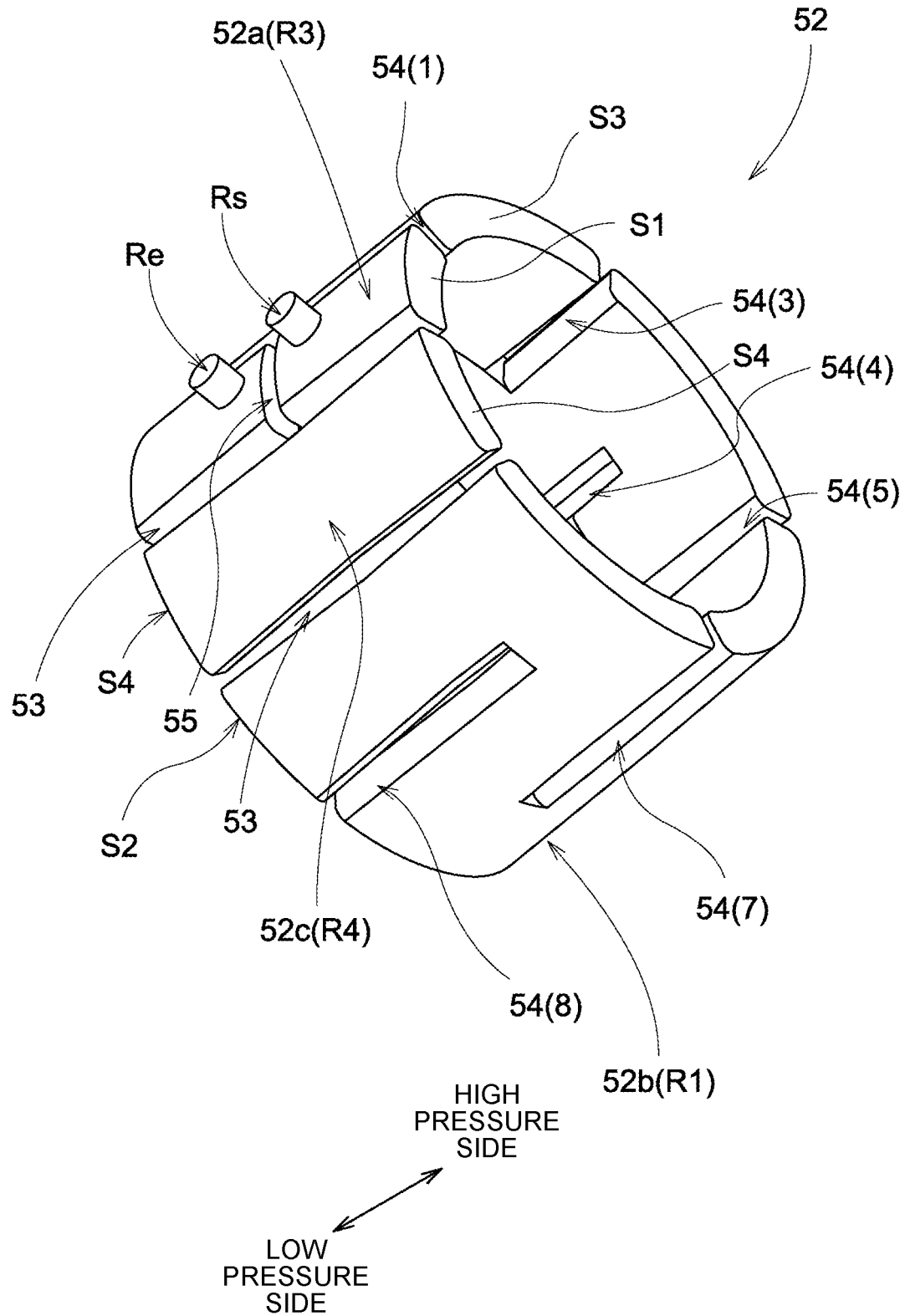
FIG. 14 is a diagram illustrating a hollow space formed inside the first housing part.

The first cooling passage portion R1, the communication passage portion R3, and the additional communication passage portion R4 are provided in the first housing part 5. In the following, the formation of each of the portions R1, R3, and R4 will be described with reference to FIG. 12 to FIG. 14. FIG. 12 is a diagram of the first housing part 5 viewed from the high pressure side. FIG. 13 is a diagram of the first housing part 5 viewed from the low pressure side. Moreover, FIG. 14 is a diagram illustrating the hollow space 52 formed inside the first housing part 5.

Similar to the first embodiment, in this example also, the first housing part 5 has a substantially cylindrical hollow space (cylindrical space) 52 surrounding the housing space 51 from the peripheral direction and having an opened end portion in the axial direction. Then, the inside of the cylindrical space 52 is partitioned by a plurality of partition parts (two long partition parts 53 and a plurality of short partition parts 54) and the dividing part 55.

The basic configuration of each of the partition parts 53 and 54 is the same as that in the first embodiment. However, in the first embodiment, one long partition part 53 and the odd number of the short partition parts 54(1) to 54(9) are provided as the partition parts 53 and 54. However, in the present embodiment, a long partition part 53 is provided instead of the ninth short partition part 54(9). In other words, in the present embodiment, two long partition parts 53 and the even-numbered short partition parts 54(1) to 54(8) are arranged at substantially equal intervals in the peripheral direction.

Thus, as illustrated in FIG. 12, an arc-shaped opening (fourth opening) S4 is formed on the end surface on the high pressure side of the first housing part 5 between the two long partition parts 53. Moreover, an arc-shaped opening (first opening) S1 is formed between one long partition part 53 and the first short partition part 54(1). Furthermore, an arc-shaped opening S3 corresponding to the combined length of the first opening S1 and the second opening S2 is formed between each of the odd-numbered short partition parts 54(1), 54(3), . . . , 54(7), and between the seventh short partition part 54(7) and the long partition part 53. On the other hand, as illustrated in FIG. 13, the arc-shaped opening (fourth opening) S4 is formed on the end surface on the low pressure side of the first housing part 5, between the two long partition parts 53. Moreover, the arc-shaped opening (second opening) S2 is formed between the long partition part 53 and the eighth short partition part 54(8). Furthermore, the arc-shaped opening S3 corresponding to the combined length of the first opening S1 and the second opening S2 is formed between each of the even-numbered short partition parts 54(2), 54(4), . . . , 54(8), and between the second short partition part 54(2) and the long partition part 53. The openings S1 to S4 that appear on each end surface on the low pressure side and the high pressure side, are closed when the second housing part 6 is fixed to each end surface in a liquid-tight manner.

In this manner, by providing the two long partition parts 53 in the cylindrical space 52, the cylindrical space 52 is divided into an elongated portion 52c that extends in the axial direction with a pair of the fourth openings S4 on both ends, and a C-shaped cross-section portion other than the above. This elongated portion 52c configures the additional communication passage portion R4 in the cooling passage R.

On the other hand, with the first opening S1 and the second opening S2 at both ends, the C-shaped cross-section portion is formed with a zigzag-shaped passage, that is, a meandering passage in which a portion that extends in the axial direction by being guided by each short partition part 54, and a U-shaped portion that passes around the end of each short partition part 54 and that folds back 180 degrees appear alternately.

The dividing part 55 is a portion that extends between the long partition part 53 and the first short partition part 54(1) in the peripheral direction, and divides the space between the long partition part 53 and the first short partition part 54(1) in the axial direction. Consequently, the meandering passage formed in the C-shaped cross-section portion is divided into the short portion 52a that extends from the first opening S1 to the dividing part 55, and the meandering portion 52b that extends from the second opening S2 to the dividing part 55. The short portion 52a configures the communication passage portion R3 in the cooling passage R, and the latter meandering portion 52b configures the first cooling passage portion R1 in the cooling passage R.

Second Cooling Passage Portions R2o and R2i

The high-pressure side second cooling passage portion R2o is provided in the high-pressure side second housing part 6*o*. The configuration of the high-pressure side second cooling passage portion R2*o* is the same as that in the first embodiment (see FIG. 8).

Figure 15:
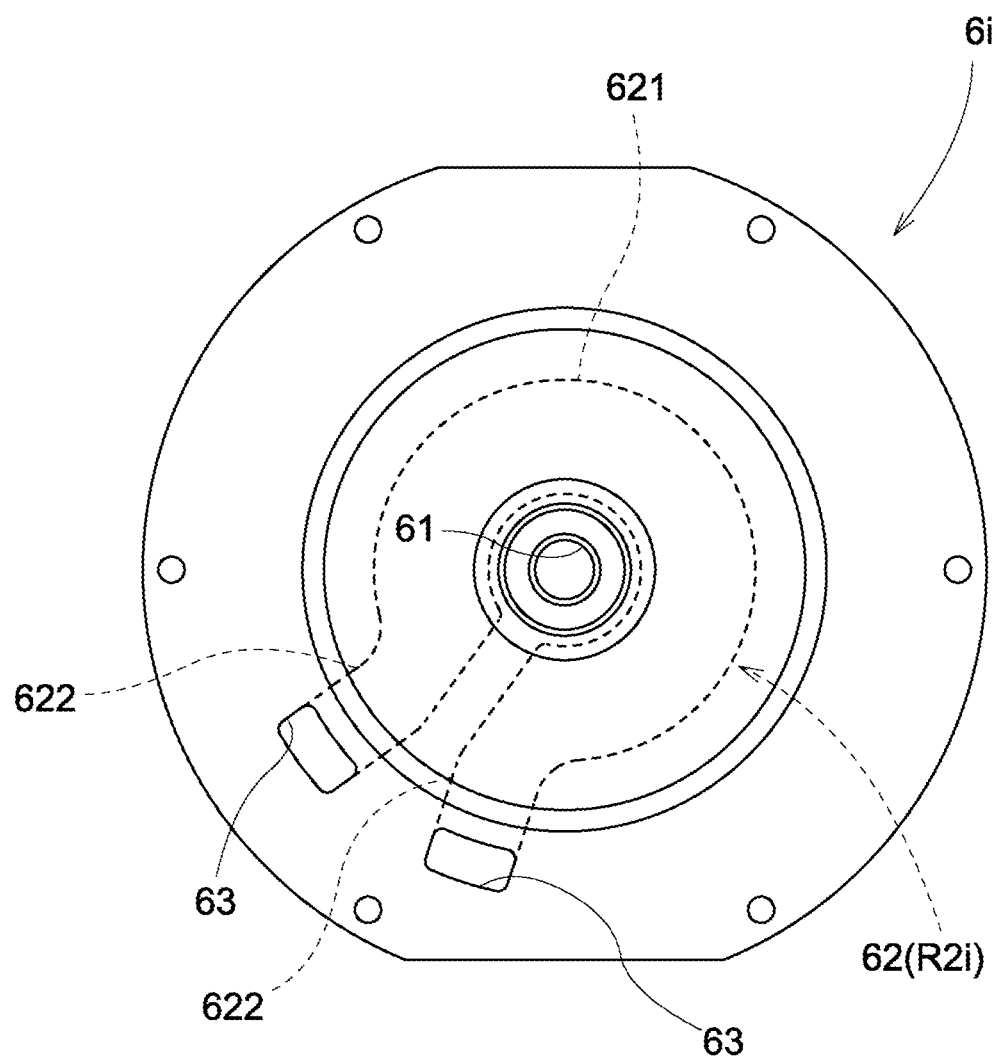
FIG. 15 is a diagram of a second housing part on the low pressure side, viewed from a side where the second housing part on the low pressure side is fixed to the first housing part.

On the other hand, the low-pressure side second cooling passage portion R2*i* is provided in the low-pressure side second housing part 6*i*. The configuration of the low-pressure side second cooling passage portion R2*i* will be described with reference to FIG. 15. FIG. 15 is a diagram of the low-pressure side second housing part 6*i*, viewed from a side where the low-pressure side second housing part 6*i* is fixed to the first housing part 5.

Similar to the high-pressure side second housing part 6*o*, the low-pressure side second housing part 6*i* also has a C-shaped hollow space (C-shaped space) 621 that substantially completely surrounds the housing through hole 61 from the peripheral direction when viewed from the axial direction. Each end portion of the C-shaped space 621 communicates with one end of a straight hollow space (extension space) 622 that extends in the radial direction. Moreover, the other end of each extension space 622 communicates with the opening 63 provided to the surface at the side that faces the first housing part 5 in the low-pressure side second housing part 6*i*. A portion 62 formed by the C-shaped space 621 and each extension space 622 configures the second cooling passage portion (low-pressure side second cooling passage portion) R2*i* in the cooling passage R.

Overall Configuration of Cooling Passage R

Figure 16:
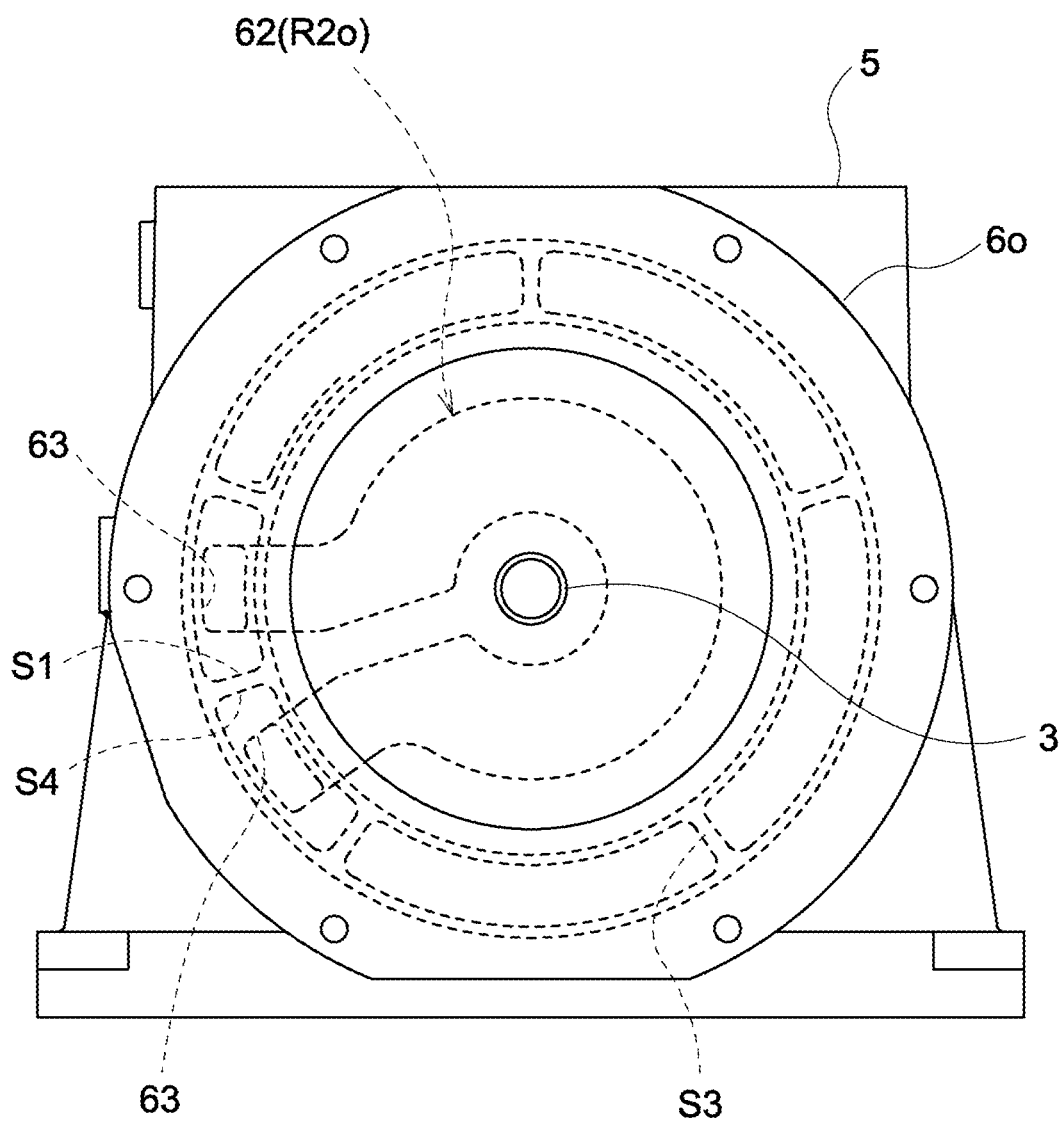
FIG. 16 is a diagram of the casing part viewed from the high pressure side.
Figure 17:
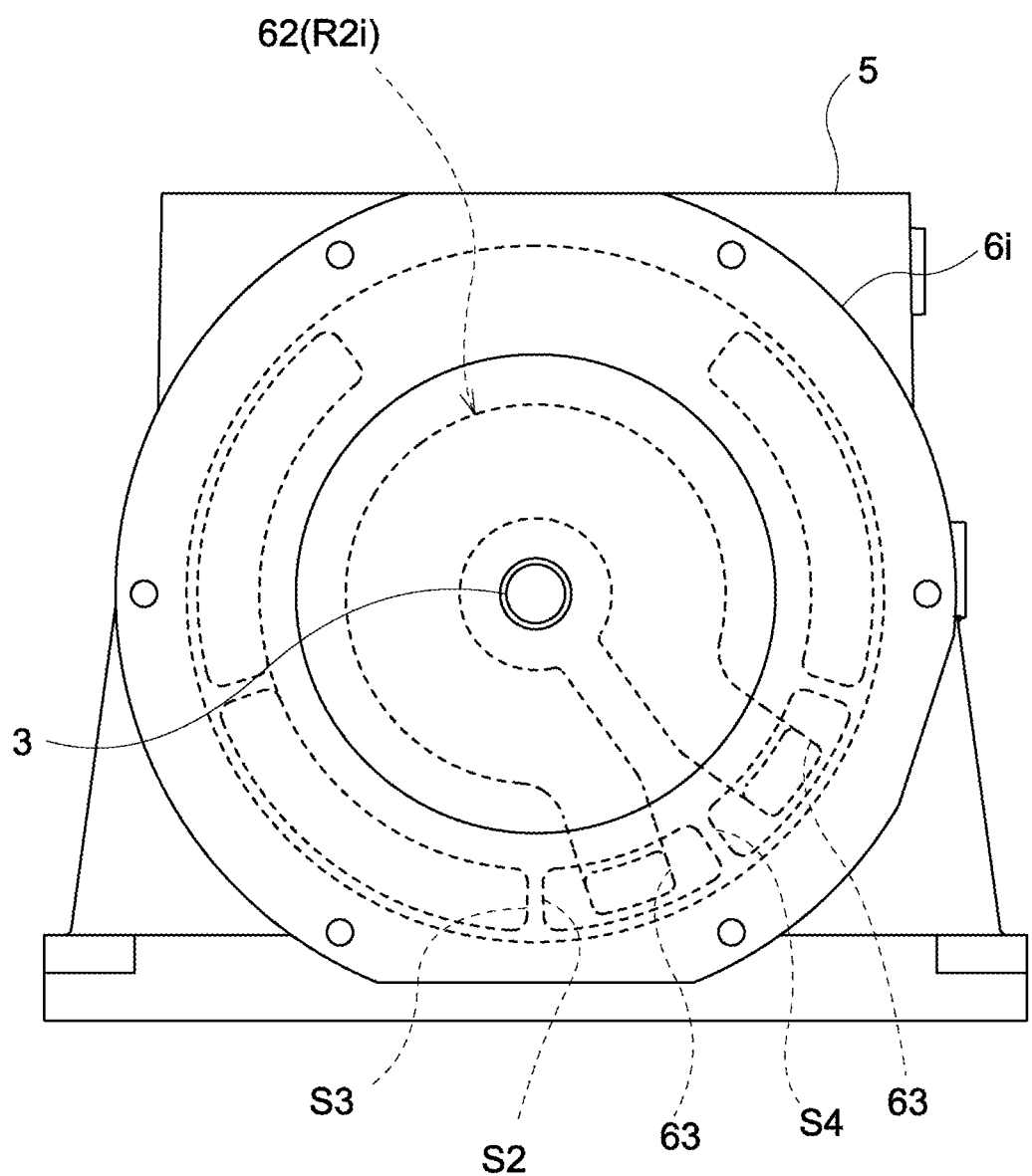
FIG. 17 is a diagram of the casing part viewed from the low pressure side.
Figure 18:
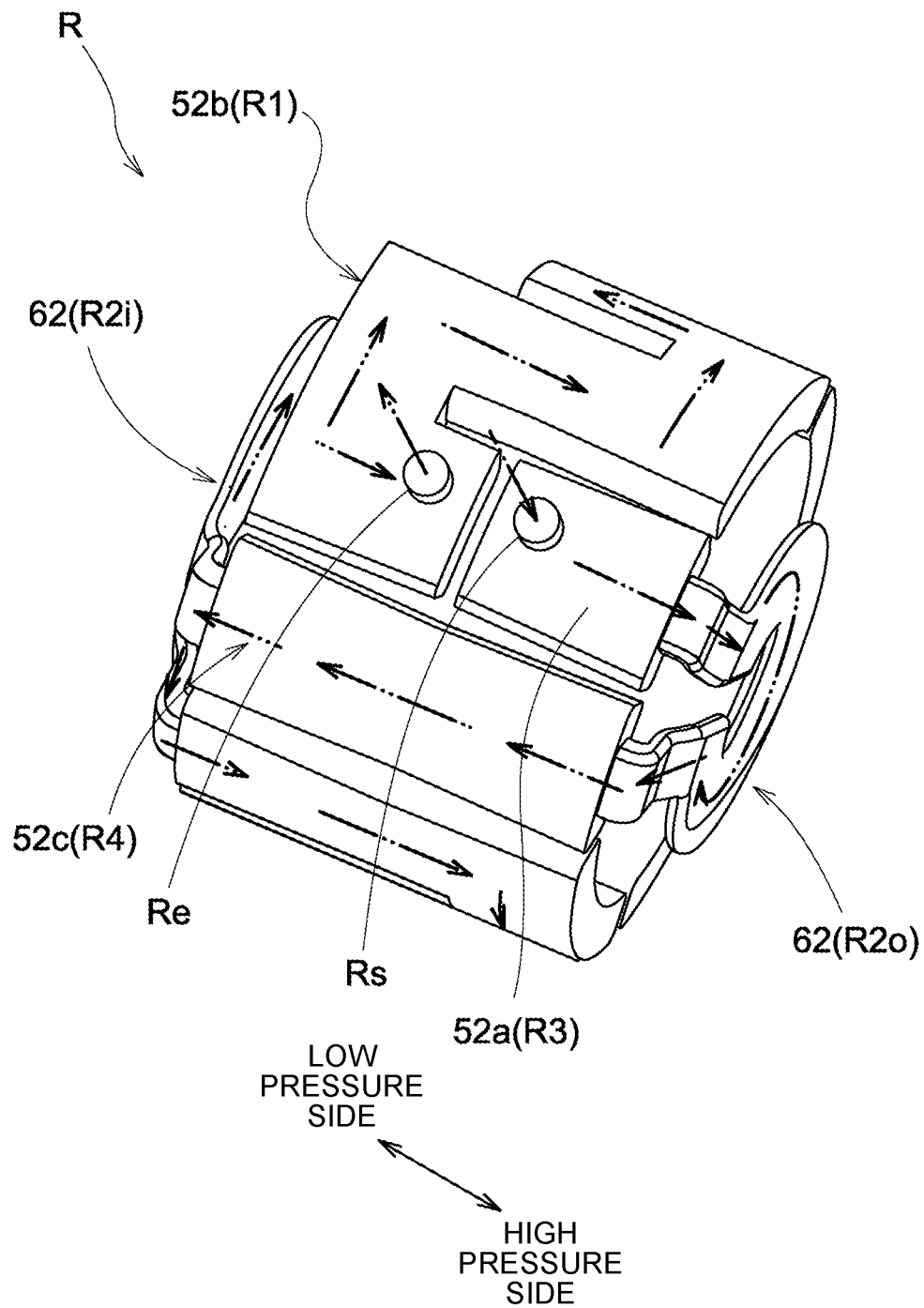
FIG. 18 is a diagram illustrating an overall configuration of the cooling passage.
Figure 19:
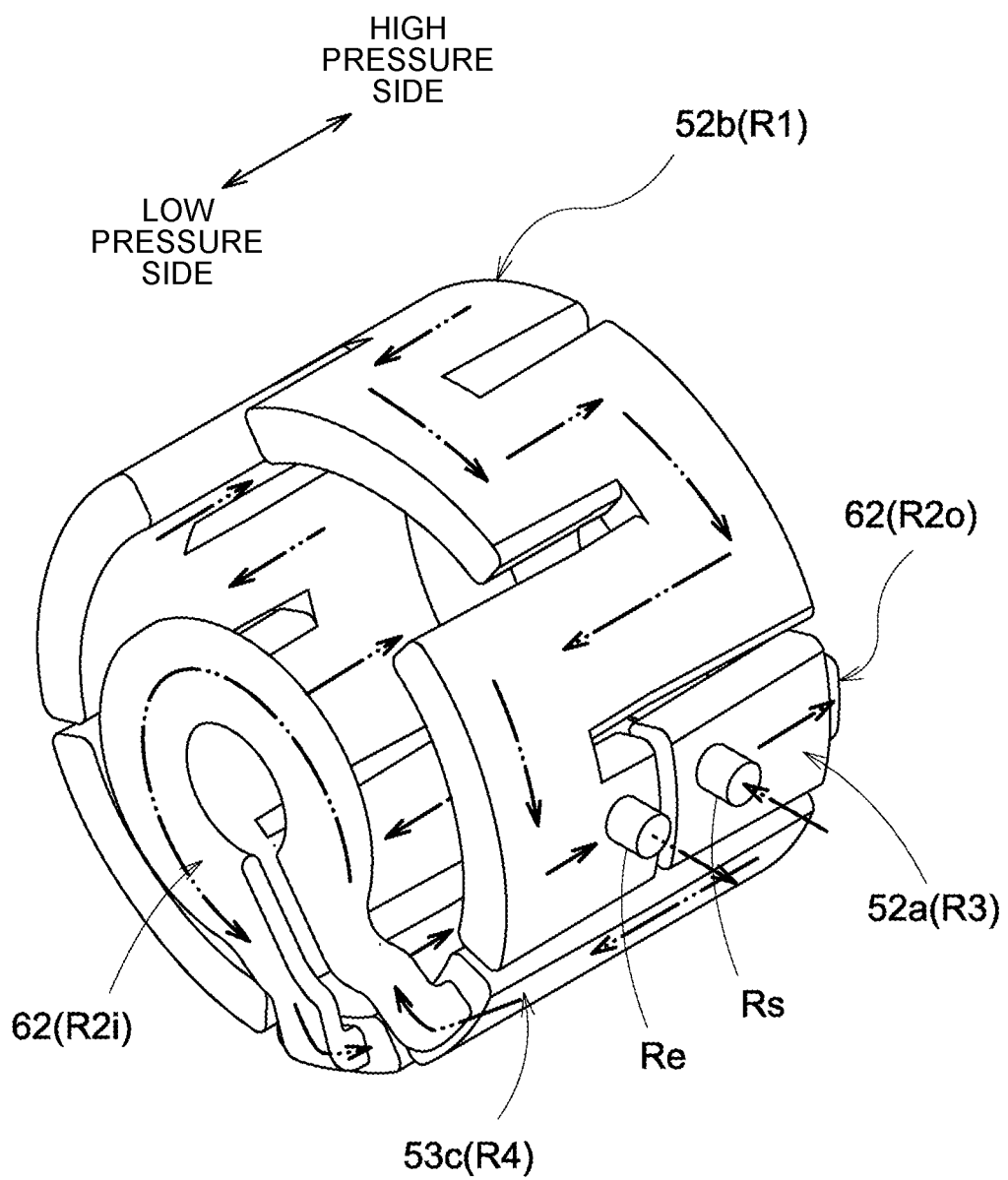
FIG. 19 is a diagram illustrating an overall configuration of the cooling passage.

Next, an overall configuration of the cooling passage R will be described with reference to FIG. 16 to FIG. 19. FIG. 16 is a diagram of the casing part 20 viewed from the high pressure side. FIG. 17 is a diagram of the casing part 20 viewed from the low pressure side. FIG. 18 and FIG. 19 are diagrams each illustrating an overall configuration of the cooling passage R.

As described above, the openings S1 to S4 that appear on each end surface on the low pressure side and the high pressure side of the first housing part 5 are closed when the high-pressure side second housing part 6*o* or the low-pressure side second housing part 6*i* is fixed to each end surface in a liquid-tight manner.

However, the side surface of the high-pressure side second housing part 6*o* has two openings 63 that configure each end portion of the high-pressure side second cooling passage portion R2*o*. In a state in which the high-pressure side second housing part 6*o* is fixed to the end surface on the high pressure side of the first housing part 5, each of the openings 63 is disposed at a position communicating with each of the first opening S1 and the fourth opening S4 on the end surface. Thus, when the high-pressure side second housing part 6*o* is fixed to the end surface on the high pressure side of the first housing part 5, the first opening S1 that is one end of the communication passage portion R3 communicates with one end of the high-pressure side second cooling passage portion R2*o*, and the fourth opening S4 that is one end of the additional communication passage portion R4 communicates with the other end of the high-pressure side second cooling passage portion R2*o*.

Moreover, the two openings 63 that configure each end portion of the low-pressure side second cooling passage portion R2*i* are provided to the side surface of the low-pressure side second housing part 6*i*. In a state in which the low-pressure side second housing part 6*i* is fixed to end surface on the low pressure side of the first housing part 5, each of the openings 63 is disposed at a position communicating with each of the fourth opening S4 and the second opening S2 on the end surface. Thus, when the low-pressure side second housing part 6*i* is fixed to the end surface on the low-pressure side of the first housing part 5, the fourth opening S4 that is the other end of the additional communication passage portion R4, communicates with one end of the low-pressure side second cooling passage portion R2*i*, and the second opening S2 that is one end of the first cooling passage portion R1, communicates with the other end of the low-pressure side second cooling passage portion R2*i*.

Consequently, the communication passage portion R3, the high-pressure side second cooling passage portion R2*o*, the additional communication passage portion R4, the low-pressure side second cooling passage portion R2*i*, and the first cooling passage portion R1 are connected in series in this order, and form a single cooling passage R that does not branch off in the middle (that is, without branching).

At each end portion of the cooling passage R, an inlet Rs or an outlet Re for cooling medium is provided. That is, the inlet Rs for cooling medium is provided to the end portion on the communication passage portion R3 side of the cooling passage R, and the outlet Re for cooling medium is provided to the end portion on the first cooling passage portion R1 side.

In such a configuration, the cooling medium introduced from the inlet Rs flows through the communication passage portion R3 into the high-pressure side second cooling passage portion R2*o*, and flows therethrough. In the inside of the high-pressure side second housing part 6*o*, the high-pressure side second cooling passage portion R2*o* is provided so as to substantially completely surround the housing through hole 61 in which the bearing 3 is housed from the peripheral direction. Hence, when the cooling medium passes therethrough, the heat is dissipated from the side of the bearing 3 on the high pressure side. Moreover, the high-pressure side second housing part 6*o* has the second cooling passage portion R2*o* through which the cooling medium passes. Hence, the high-pressure side second housing part 6*o* functions as a thermal insulation member. That is, for example, when a heat source (for example, the hot air G2 compressed and heated by the rotation of the high-pressure side rotary blade 92) is present outside the casing part 20 on the high pressure side of the rotating shaft 2, the high-pressure side second housing part 6*o* can block at least a part of the heat transferred from the heat source G2.

The cooling medium that flows through the high-pressure side second cooling passage portion R2*o* and that has removed heat from the side of the bearing 3 on the high pressure side subsequently flows through the additional communication passage portion R4 into the low-pressure side second cooling passage portion R2*i*, and flows therethrough. The low-pressure side second cooling passage portion R2*i* is provided inside the low-pressure side second housing part 6*i* so as to substantially completely surround the housing through hole 61 in which the bearing 3 is housed from the peripheral direction. Hence, when the cooling medium passes therethrough, the heat is dissipated from the side of the bearing 3 on the low pressure side. Moreover, the low-pressure side second housing part 6*i* has the second cooling passage portion R2*i* through which the cooling medium passes. Hence, the low-pressure side second housing part 6*i* functions as a thermal insulation member. That is, for example, when a heat source (for example, the hot air G1 compressed and heated by the rotation of the low-pressure side rotary blade 91) is present outside the casing part 20 on the low pressure side of the rotating shaft 2, the low-pressure side second housing part 6*i* can block at least a part of the heat transferred from the heat source G1.

The cooling medium that has flowed through the low-pressure side second cooling passage portion R2i and that has removed heat from the side of the bearing 3 on the low-pressure side and the like, then flows into the first cooling passage portion R1, and flows therethrough. Similar to the first embodiment, in this example also, in the inside of the first housing part 5, the first cooling passage portion R1 is provided as a meandering passage that covers the substantially whole of the peripheral wall portion surrounding the housing space 51. Thus, when the cooling medium flows therethrough, the substantially whole of the peripheral wall portion surrounding the housing space 51 is scanned by the cooling medium, and the heat is sufficiently dissipated from the outer peripheral side of the main body part 10. The cooling medium that has flowed through the first cooling passage portion R1 is led out from the outlet Re.

FIG. 21(b) schematically illustrates the configuration of the cooling passage R according to the present embodiment. As illustrated in the example, the cooling passage R includes the first cooling passage portion R1 that passes through the inside of the first housing part 5 and the second cooling passage portions R2o and R2i that pass through the inside of the second housing parts 6o and 6i on the high pressure side and the low pressure side. Hence, the cooling medium that flows through the cooling passage portions R1, R2o, and R2i dissipates heat from the outer peripheral side of the main body part 10 and dissipates heat from the side of the bearings 3 on the high pressure side and the low pressure side. Moreover, each of the second housing parts 6o and 6i on the high pressure side and the low pressure side can function as a thermal insulation member. That is, it is possible to suppress the temperature rise of the main body part 10 (particularly, each bearing 3 on the high pressure side and the low pressure side), by blocking at least a part of the heat transferred from the heat sources G1 and G2 that are present outside the casing part 20 on each shaft end side of the rotating shaft 2.

Furthermore, similar to the first embodiment, in this example also, the cooling passage R is a single passage extending from the inlet Rs to the outlet Re and not branching off in the middle. Hence, the flow rate of the cooling medium at each portion of the cooling passage R is kept constant even if the condition of the cooling medium supplied from the inlet Rs is changed. That is, it is possible to allow the cooling medium to flow throughout the cooling passage R at a constant flow rate. Thus, the thermal insulation properties of each of the second housing parts 6o and 6i on the high pressure side and the low pressure side are maintained in a stable manner. That is, it is possible to block at least a part of the heat transferred from the heat sources G1 and G2, and sufficiently suppress the temperature rise of each bearing 3 on the high pressure side and the low pressure side.

Figure 22C:
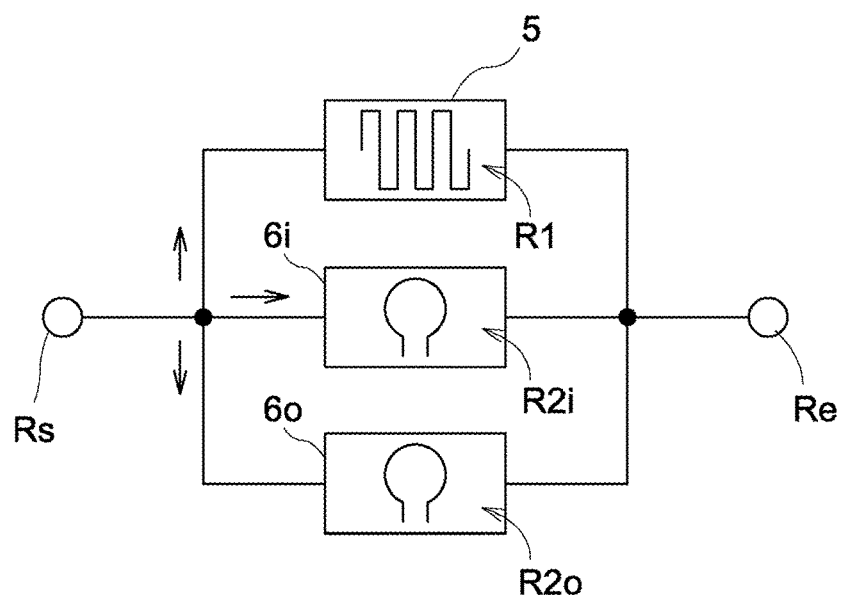
FIG. 22C is a diagram schematically illustrating a cooling passage used as a comparative example.

For example, as illustrated in FIG. 22C, it is also conceivable to use a cooling passage branching into the portion R1 that passes through the inside of the first housing part 5, the portion R2o that passes through the inside of the high-pressure side second housing part 6o, and the portion R2i that passes through the inside of the low-pressure side second housing part 6i, in the middle of the cooling passage extending from the inlet Rs to the outlet Re. In such a configuration also, the heat is dissipated from the outer peripheral side of the main body part 10 and from the side of each bearing 3 on the high pressure side and the low pressure side. However, in such a configuration, if the condition of the cooling medium supplied from the inlet Rs is changed, the flow rate and the like at each split flow portion in the cooling passage vary according to the flow passage resistance of the portion. Thus, it is difficult to maintain the thermal insulation properties of the second housing parts 6o and 6i on the high pressure side and the low pressure side in a stable manner. Apparently, when the number of branches is increased, it is difficult to maintain the stability. In this manner, with the cooling passage that branches off in the middle as illustrated in FIG. 22C, it is not possible to obtain the same effects as those of the cooling passage R according to the present embodiment.

<2-3. Effects>

With the rotary electrical machine 200 according to the present embodiment, it is possible to obtain the same effects as those of the rotary electrical machine 100 according to the first embodiment.

In particular, in the rotary electrical machine 200 according to the present embodiment, the second housing part 6 is provided on one side and the other side in the axial direction of the first housing part 5, and the second cooling passage portion R2 is provided in both of the two second housing parts 6. For example, when the rotary electrical machine 100 is mounted on a multistage compressor (FIG. 20), the second housing parts 6o and 6i can block at least a part of the heat transferred from the heat sources G1 and G2, by providing the second cooling passage portion R2 on each second housing part 6 (the high-pressure side second housing part 6o and the low-pressure side second housing part 6i) disposed on the high pressure side and the low pressure side, where the heat sources (air heated by compression) G1 and G2 are present outside the casing part 20 on both the high pressure side and the low pressure side of the rotating shaft 2. Moreover, with this configuration, heat can be dissipated from both of the two bearings 3 provided on both sides of the rotating shaft 2. Hence, it is possible to achieve a particularly high heat dissipation performance.

3. Modification

In the embodiments described above, the shape and formation of the portions R1 to R4 included in the cooling passage R are not limited to those illustrated above. For example, one or both of the communication passage portion R3 and the additional communication passage portion R4 in each of the embodiments described above may be formed using external piping or the like. Moreover, the communication passage portion R3 may be omitted by providing the inlet Rs on the second housing part 6. Furthermore, for example, in the embodiments described above, the first cooling passage portion R1 is a meandering passage in which straight portions extending in the axial direction appear repeatedly. However, the first cooling passage portion R1 may also be a meandering passage in which straight portions extending in the peripheral direction appear repeatedly.

In the second embodiment, the high-pressure side second cooling passage portion R2o is provided on the upstream side of the low-pressure side second cooling passage portion R2i. However, this may be reversed. That is, the communication passage portion R3, the low-pressure side second cooling passage portion R2i, the additional communication passage portion R4, the high-pressure side second cooling passage portion R2o, and the first cooling passage portion R1 may be connected in series in this order, and form a single cooling passage that does not branch off in the middle.

In the embodiments described above, the configuration of the main body part 10 is not limited to that illustrated above. For example, the rotor 1 may have a configuration in which a plurality of electromagnetic steel sheets are laminated in the axial direction. Moreover, for example, in the embodiments described above, the portion of the coil conductor 42a that protrudes from the end surface side of the stator core 41 in the axial direction is press-molded and then resin-sealed. However, the protruding portion may also be resin-sealed without press-molding. Moreover, for example, the main body part may be configured as an outer rotor type in which a rotor is disposed outside the stator.

In the embodiments described above, the rotary electrical machines 100 and 200 do not necessarily need to be mounted on a multistage compressor. That is, the present invention can be applied not only on the rotary electrical machine mounted on the multistage compressors, but also on other various rotary electrical machines.

Other configurations can be modified in various manners without departing from the spirit of the present invention.

REFERENCE SIGNS LIST

1 Rotor
2 Rotating shaft
3 Bearing
4 Stator
5 First housing part
6 Second housing part
7 Lid part
6i Low-pressure side second housing part
6o High-pressure side second housing part
10 Main body part
20 Casing part
51 Housing space
52 Hollow space (cylindrical space)
53 Long partition part
54 Short partition part
55 Dividing part
61 Housing through hole
62 Hollow space (C-shaped space)
63 Extension space
64 Opening
100, 200 Rotary electrical machine
R Cooling passage
R1 First cooling passage portion
R2 Second cooling passage portion
R2i Low-pressure side second cooling passage portion
R2o High-pressure side second cooling passage portion
R3 Communication passage portion
R4 Additional communication passage portion
Rs Inlet
Re Outlet

The invention claimed is:

1. A rotary electrical machine, comprising:
a main body part that includes a rotor and a stator; and
a casing part that houses the main body part, wherein
the casing part includes
a first housing part that surrounds the main body part from a peripheral direction, and
a second housing part that houses a bearing for rotatably supporting a rotating shaft,
the casing part is formed with a cooling passage extending from an inlet for cooling medium to an outlet for cooling medium and not branching off in a middle, and
the cooling passage includes a first cooling passage portion and a communication passage portion that passes through inside of the first housing part and a second cooling passage portion that passes through inside of the second housing part,
the second cooling passage portion includes:
two extension spaces communicates with the first cooling passage portion or the communication passage portion, and protrude radially inward from the first cooling passage portion; and
C-shaped space that communicates with the two extension spaces at both ends and surrounds a part of the entire circumference of a housing through hole in which the bearing is housed, as viewed from the axial direction,
the two extension spaces includes a first extension space communicating with the communication passage portion in which the inlet for the cooling medium is provided, and a second extension space communicating with the first cooling passage portion in which the outlet for the cooling medium is provided,
one end of the C-shaped space communicates with the first extension space, and the other end communicates with the second extension space.

2. The rotary electrical machine according to claim 1, wherein
the first housing part has a hollow space surrounding the main body part from a peripheral direction and having an opened end portion in an axial direction,
the opened end portion in the hollow space is closed by the second housing part, and
at least a part of the hollow space forms the first cooling passage portion.

3. The rotary electrical machine according to claim 2, wherein
the second housing part is provided on one side and another side in an axial direction of the first housing part, and
the second cooling passage portion is provided to only one of the two second housing parts.

4. The rotary electrical machine according to claim 2, wherein
the second housing part is provided on one side and another side in an axial direction of the first housing part, and
the second cooling passage portion is provided to the two second housing parts.

5. The rotary electrical machine according to claim 1, wherein
the second housing part is provided on one side and another side in an axial direction of the first housing part, and
the second cooling passage portion is provided to only one of the two second housing parts.

6. The rotary electrical machine according to claim 1, wherein
the second housing part is provided on one side and another side in an axial direction of the first housing part, and
the second cooling passage portion is provided to the two second housing parts.

* * * * *